United States Patent
Howitt et al.

(10) Patent No.: US 10,226,152 B2
(45) Date of Patent: Mar. 12, 2019

(54) LIQUID HEATING APPARATUS AND OPERATING METHODS

(71) Applicant: Strix Limited, Ronaldsway, Isle of Man (GB)

(72) Inventors: James Howitt, Colby (GB); Colin Peter Moughton, Port St Mary (GB)

(73) Assignee: Strix Limited, Ronaldsway (IM)

( * ) Notice: Subject to any disclaimer, the term of this patent is extended or adjusted under 35 U.S.C. 154(b) by 524 days.

(21) Appl. No.: 14/763,433

(22) PCT Filed: Jan. 22, 2014

(86) PCT No.: PCT/GB2014/050174
§ 371 (c)(1),
(2) Date: Jul. 24, 2015

(87) PCT Pub. No.: WO2014/114935
PCT Pub. Date: Jul. 31, 2014

(65) Prior Publication Data
US 2016/0045062 A1   Feb. 18, 2016

(30) Foreign Application Priority Data
Jan. 24, 2013   (GB) .................................. 1301297.6

(51) Int. Cl.
*F24H 1/18*        (2006.01)
*A47J 31/54*       (2006.01)
(Continued)

(52) U.S. Cl.
CPC ........... *A47J 31/545* (2013.01); *A47J 31/401* (2013.01); *A47J 31/402* (2013.01); *A47J 31/54* (2013.01); *A47J 31/56* (2013.01)

(58) Field of Classification Search
None
See application file for complete search history.

(56) References Cited

U.S. PATENT DOCUMENTS

| | | |
|---|---|---|
| 5,397,031 A | 3/1995 | Jensen |
| 5,408,917 A | 4/1995 | Lussi |

(Continued)

FOREIGN PATENT DOCUMENTS

| | | |
|---|---|---|
| CN | 201165611 | 12/2008 |
| CN | 201177768 | 1/2009 |

(Continued)

OTHER PUBLICATIONS

World Health Organization, "Safe Preparation, Storage and Handling of Powdered Infant Formula Guidelines", 2007.
Japanese office action for JP2015-554246 dated Jan. 9, 2018.

*Primary Examiner* — Thor Campbell
(74) *Attorney, Agent, or Firm* — O'Shea Getz P.C.

(57) ABSTRACT

An apparatus for dispensing a predetermined volume of a warm liquid includes a heater, a pump and a temperature sensor sensitive to the temperature of the liquid upstream of the heater. A controller is arranged to receive upstream temperature data from the temperature sensor, calculate the amount of energy required to reach a desired final temperature, energize the heater for a calculated period of ON time, and dispense liquid for a calculated period of time that is at least partly contemporaneous with the calculated period of ON time. After the heater has been de-energized, the dispensed liquid removes residual heat so that the average temperature after dispensing the predetermined volume is the desired final temperature.

20 Claims, 12 Drawing Sheets

(51) Int. Cl.
*A47J 31/40* (2006.01)
*A47J 31/56* (2006.01)

(56) References Cited

U.S. PATENT DOCUMENTS

| | | | |
|---|---|---|---|
| 5,671,325 A * | 9/1997 | Roberson | A47J 31/41 |
| | | | 222/146.5 |
| 6,118,933 A * | 9/2000 | Roberson | A47J 31/41 |
| | | | 222/146.5 |
| 6,253,028 B1 * | 6/2001 | Roberson | A47J 31/41 |
| | | | 222/146.5 |
| 6,411,777 B2 * | 6/2002 | Roberson | A47J 31/41 |
| | | | 222/146.5 |
| 6,766,106 B2 * | 7/2004 | Roberson | A47J 31/41 |
| | | | 222/146.5 |
| 7,870,975 B2 | 1/2011 | Siemer | |
| 2001/0012448 A1 * | 8/2001 | Roberson | A47J 31/41 |
| | | | 392/442 |
| 2002/0127005 A1 * | 9/2002 | Roberson | A47J 31/41 |
| | | | 392/442 |
| 2002/0175162 A1 | 11/2002 | Kim | |
| 2004/0187693 A1 | 9/2004 | Fuchs | |
| 2006/0096465 A1 | 5/2006 | Hu et al. | |
| 2007/0056449 A1 | 3/2007 | Giampaolo | |
| 2008/0041236 A1 | 2/2008 | Raouf et al. | |
| 2008/0160153 A1 | 7/2008 | Hestekin et al. | |
| 2008/0191651 A1 | 8/2008 | Doglioni Majer | |
| 2009/0120161 A1 | 5/2009 | Ishiguro et al. | |
| 2009/0151574 A1 | 6/2009 | Sybien et al. | |
| 2009/0183637 A1 | 7/2009 | Roberson | |
| 2010/0101427 A1 | 4/2010 | Mulder | |
| 2010/0326285 A1 | 12/2010 | Kang et al. | |
| 2011/0121350 A1 | 5/2011 | Lee et al. | |
| 2011/0127255 A1 | 6/2011 | Boussemart et al. | |
| 2011/0213505 A1 | 9/2011 | Ferber et al. | |
| 2012/0128338 A1 * | 5/2012 | Garvey | A47J 31/542 |
| | | | 392/465 |
| 2013/0094841 A1 * | 4/2013 | Garvey | A47J 31/542 |
| | | | 392/465 |
| 2013/0337132 A1 | 12/2013 | Fenna | |
| 2014/0093225 A1 | 4/2014 | Ashton | |
| 2014/0233928 A1 | 8/2014 | Moughton et al. | |

FOREIGN PATENT DOCUMENTS

| | | |
|---|---|---|
| EP | 2074916 | 7/2009 |
| JP | 2003325329 | 11/2003 |
| JP | 2012061127 | 3/2012 |
| KR | 100827383 | 5/2008 |
| RU | 2136097 | 8/1999 |
| WO | 2010106348 | 12/2010 |
| WO | 0119224 | 3/2011 |
| WO | 2011089434 | 9/2011 |
| WO | 2011157576 | 12/2011 |
| WO | 2011157675 | 12/2011 |
| WO | 2013100486 | 7/2013 |

* cited by examiner

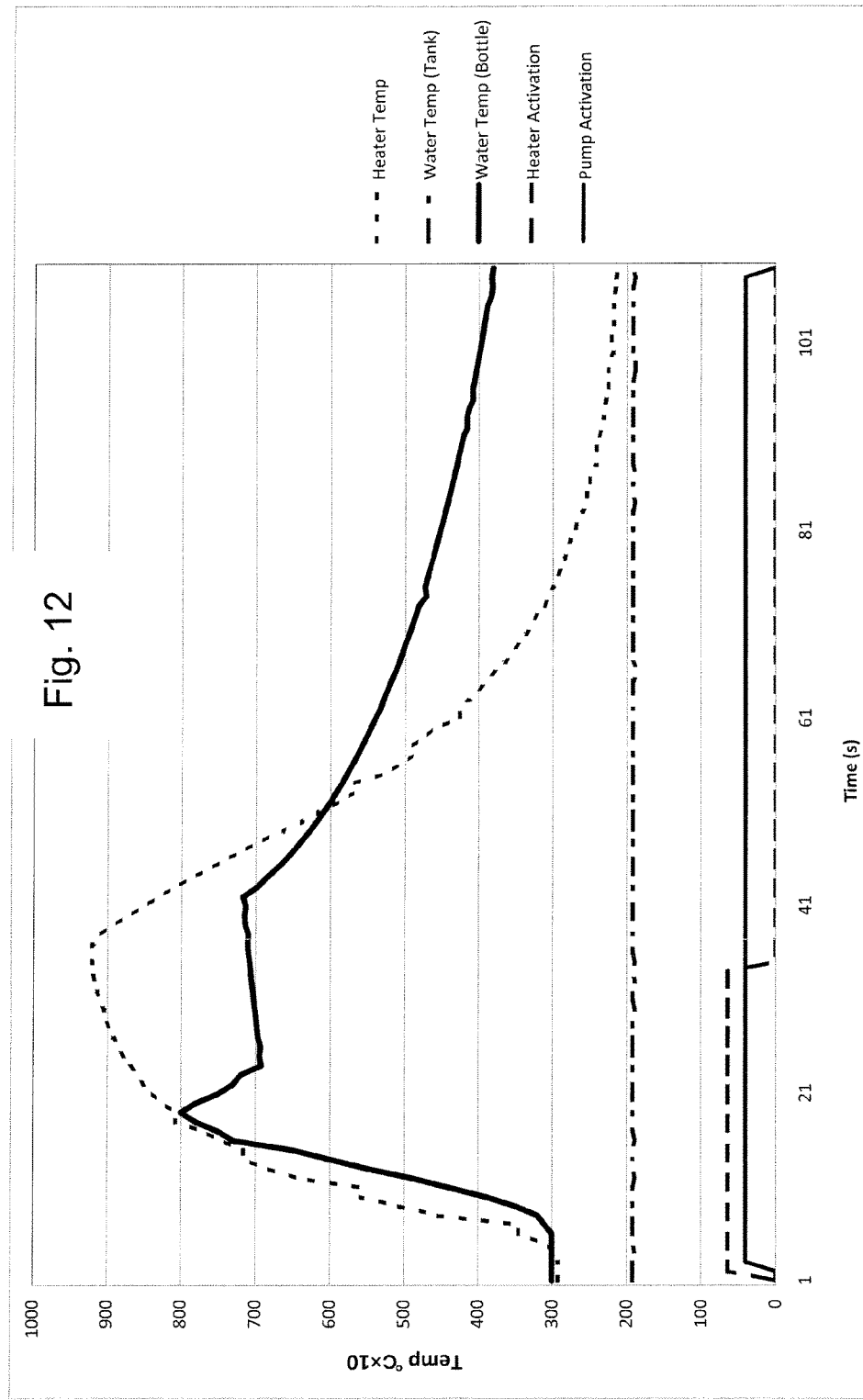

LIQUID HEATING APPARATUS AND OPERATING METHODS

This application is entitled to the benefit of and incorporates by reference essential subject matter disclosed in PCT Application No. PCT/GB2014/050174 filed on Jan. 22, 2014, which claims priority to GB1301297.6 filed Jan. 24, 2013.

BACKGROUND OF THE INVENTION

1. Technical Field

This invention relates to methods and apparatuses for heating a predetermined volume of water to a desired temperature, for example warm water for use in the preparation of infant formula milk or other infant food.

2. Background Information

The current manufacturing technology does not make it feasible to produce and store sterile powdered infant formula, which is subsequently used to make infant formula milk. The World Health Organization (WHO) guidelines on preparation of infant formula milk ("Safe preparation, storage and handling of powdered infant formula: Guidelines", WHO, 2007) therefore recommend that the powdered infant formula is reconstituted by mixing it with water that has a temperature of greater than 70° C. in order to sterilize the powdered infant formula which can become contaminated with harmful bacteria such as Enterobacter Sakazakii and Salmonella Enterica.

Presently powdered infant formula or infant food is typically reconstituted by using water that was recently boiled in a kettle in order to sterilize the powdered infant formula and then allowing the liquid to cool to a temperature suitable for giving to the infant—e.g. typically approximately body temperature or a few degrees higher. However, this is a time-consuming operation and it can be difficult to judge the correct temperature accurately.

Even if the infant formula milk is not sterilized before administration using very hot water (e.g. >70° C.), it is still desirable to prepare the formula so that the milk has a final temperature around body temperature e.g. 37 ° C. when it is administered to an infant. In practice this often means that the preparation must be left to cool to the desired final temperature after mixing warm or hot water with the formula. There is no reliable way to immediately reconstitute the powdered formula at the right temperature. Although cold water can be added to a preparation to speed up the cooling process, there is a risk of the cold water not being sterile and this can affect the correct dosage as well as the final temperature.

There remains a need for an improved method of dispensing a controlled volume of warm water at a controlled temperature for the reconstitution of infant formula milk, infant food, and other purposes.

SUMMARY OF THE DISCLOSURE

When viewed from a first aspect the invention provides a method of operating an apparatus comprising heating means and a pump to dispense a predetermined volume of a warm liquid, said method comprising the steps of: measuring the temperature of the liquid upstream of the heating means; calculating an amount of energy required for the heating means to heat the predetermined volume of the liquid from the upstream temperature to a desired final temperature; calculating a period of "ON" time required for energization of the heating means to deliver the calculated amount of energy; energizing the heating means for the calculated period of "ON" time; operating the pump during a first period of time to dispense a first volume of heated liquid at or above a predetermined initial temperature from an outlet of the apparatus, wherein the first period of time is at least partly contemporaneous with the calculated period of "ON" time; de-energizing the heating means; and operating the pump for a second period of time subsequent to the first period of time to dispense a second volume of the liquid from the outlet of the apparatus thereby removing residual heat from the heating means, the first and second volumes together providing the predetermined volume, wherein the average temperature of the first and second volumes of the liquid is the desired final temperature after the predetermined volume has been dispensed.

When viewed from a second aspect the invention provides an apparatus for dispensing a predetermined volume of a warm liquid, comprising heating means, a pump, a temperature sensor sensitive to the temperature of the liquid upstream of the heating means, and control means arranged to: receive upstream temperature data from the temperature sensor, calculate the amount of energy required for the heating means to heat a predetermined volume of the liquid from the upstream temperature to a desired final temperature, calculate a period of "ON" time required for energization of the heating means to deliver the calculated amount of energy, energize the heating means for the calculated period of "ON" time, operate the pump during a first period of time to dispense a first volume of heated liquid at or above a predetermined initial temperature from an outlet of the apparatus, wherein the first period of time is at least partly contemporaneous with the calculated period of "ON" time, de-energize the heating means, and operate the pump for a second period of time subsequent to the first period of time to dispense a second volume of the liquid from the outlet of the apparatus thereby removing residual heat from the heating means, the first and second volumes together providing the predetermined volume; wherein the average temperature of the first and second volumes of the liquid is the desired final temperature after dispensing the predetermined volume.

Thus the total amount of heat energy required to raise the temperature of the liquid from the upstream temperature to the desired final temperature is calculated and this is separated between the first volume of liquid which can, for example, be used to reconstitute the powdered infant formula at an initial temperature that is greater than 70° C., thus satisfying the WHO guidelines for preparation of the powdered infant formula, and the second volume of liquid at a lower temperature to give the total predetermined volume of dispensed liquid an average temperature equal to the desired final temperature, e.g. at 37° C. which is suitable for feeding to an infant. I.e. the desired final temperature is the average temperature of the liquid in the receptacle, e.g. a baby bottle, once all the liquid has been dispensed.

It will therefore be appreciated that the method and apparatus of the present invention allow a predetermined volume of liquid at a desired final temperature to be provided in an accurate and repeatable delivery. As well as calculating the "ON" time where the heating means is energized, i.e. to determine the amount of heat energy available to the liquid, the method may calculate the first and second periods of time for dispensing the first and second volumes of liquid, i.e. to ensure that the first and second volumes together provide the predetermined volume that a user wishes to be dispensed. Accordingly the pump may be operated during a first calculated period of time and for a second calculated period of time subsequent to the first period of time. As will be explained below, the second calculated period of time may follow immediately after the first calculated period of time, or there may be a pause between the first and second periods of pump operation. It will be understood that the calculated period of "ON" time for energization of the heating means, and the calculated first and second periods for operation of the pump, may be calculated such that the predetermined volume of liquid has the desired final temperature after it has been completely dispensed. This means that a user simply has to initiate the dispensing process and the result will be a predetermined volume of liquid being dispensed with a desired final temperature. The second period of pump operation is calculated so as to remove residual heat from the heating means such that the predetermined volume of liquid has the desired final temperature e.g. 37° C.

The separation of the dispensing between the first and second periods of time may also allow a user to mix the first volume of liquid with the powdered infant formula before the second volume of liquid is dispensed. This can be facilitated in a set of embodiments by preferably providing a pause in the pump operation between the first and second periods of time, as will be discussed below. In other embodiments the pump may be operated continuously through the first and second periods of time, the only difference being that the first period is contemporaneous with energization of the heating means while the second period is subsequent to de-energization of the heating means. A pause may not be required for a user to separately add powdered infant formula to the heated liquid, for example where the liquid is dispensed through a powder holder at the outlet, or where a user manually adds powder to the liquid before, during and/or after it is dispensed.

The heating means could comprise a batch heater in which the predetermined volume of liquid is heated for the calculated period of "ON" time before exiting the heating means. However in one set of embodiments the heating means comprises a flow heater in which liquid is permitted to enter and exit the heating means while heating is taking place. The heating means may comprise a standard flow heater or a flow heater e.g. as discussed in the Applicant's published application WO 2010/106349 and background thereto. One example of such a flow heater is the "dual tube" variety in which a liquid flow conduit and a tube containing a sheathed heating element are provided adjacent one another, e.g. brazed together. If a traditional flow heater having a "dual tube" design is used to heat liquid to boiling then the entrained steam can cause problems that prevent liquid from being evenly heated to boiling point. A solution to such problems is a flow heater that permits the separate exit of steam, e.g. as disclosed by WO 2010/106349. Where the flow heater is used to heat liquid to temperatures below boiling then steam may be permitted to escape separately, e.g. as discussed in the Applicant's published application WO 2011/077135, or steam and liquid may simply exit together from the same flow conduit. In present embodiments the desired final temperature is preferably below boiling and there may be no need for the flow heater, or other heating means, to heat liquid to boiling point. The heating means, e.g. a flow heater, may be arranged to heat the liquid to temperatures below boiling so that the phenomenon of spitting owing to hot spots and localized boiling is reduced or avoided. The heating means may be of fixed power, with the nominal heating power rated at 800 W, for example. In various examples the heating means, which is preferably a flow heater, may operate at a relatively low power such as 800 W, 900 W or 1 kW.

The apparatus could be directly connected, e.g. permanently, to a liquid supply for supplying the liquid to the pump and the heating means, for example plumbed into a mains water supply. However in one set of embodiments the apparatus comprises a reservoir for supplying liquid to the heating means. Preferably the reservoir is removable to allow it to be refilled easily by a user, e.g. from a tap. The reservoir may comprise a minimum fill sensor, e.g. connected to the control means, which is arranged to prevent operation of the apparatus (or at least of the heating means and/or pump) when the liquid level in the reservoir is below the minimum fill level. This disabling of the apparatus protects against the heating means overheating, i.e. a boil dry situation which could damage the heating means.

Whether the apparatus is connected in-line with a liquid supply, for example the mains water supply, or provided with a reservoir, the Applicant has appreciated that it may be desirable to treat (and preferably sterilize) liquid before it reaches an outlet of the apparatus. This is most conveniently achieved by providing treatment means upstream of the pump and/or heating means, although in practice the treatment means may be arranged anywhere upstream of the outlet. In one set of embodiments in which the apparatus comprises a reservoir, a treatment means may be provided upstream/downstream of the reservoir, or in the reservoir, or at an inlet/outlet of the reservoir. The treatment means may take the form of a filter, preferably an anti-microbial filter. If a filter is used then it may be preferable for it to be provided upstream of the reservoir so as not to unduly limit the flow rate out of the reservoir during operation of the apparatus. However other forms of treatment may be used instead of, or in addition to, a filter—for example UV treatment, chlorine treatment, ozone treatment, or any combination of such disinfection treatments. The aim of the treatment means is to eliminate biological contaminants and other substances so that the liquid is purified before being dispensed, which can be particularly important when dispensing warm water to make infant formula milk or food.

In one set of embodiments it is envisaged that the treatment means may comprise a heating means arranged to boil the liquid for a minimum period of time so as to achieve sterilization. The treatment means may use its own heating means for this purpose, but preferably the treatment is carried out during the calculated period of "ON" time that the heating means is energized to deliver the calculated amount of energy to the predetermined volume of liquid. This may require the apparatus to compare the calculated period of "ON" time with a minimum period of time to ensure that sterilization is achieved. For example, WHO guidelines specify that water should be boiled for "several minutes" to deactivate or kill pathogenic microbes. In such embodiments the apparatus may further comprise a heat exchanger so that the treated liquid can be cooled before being dispensed.

In the set of embodiments in which the apparatus comprises a reservoir, the apparatus may comprise an intermediate holding chamber between the reservoir and the pump, and means for filling the holding chamber from the reservoir to a predetermined level. In accordance with such embodiments the pump does not draw liquid directly from the reservoir but rather from the intermediate holding chamber. Since it is filled to a predeteimined level, the pressure head at the pump inlet will be known and can therefore be factored into the calculations of pump speed, flow rate etc.

Preferably the intermediate holding chamber has a smaller volume than the reservoir. Even though the level of liquid in the intermediate holding chamber may reduce during dispensing, the variation in pressure is over a smaller range than it would be if the liquid were to be drawn from the larger reservoir.

Where a reservoir is provided, preferably the upstream temperature is measured in the reservoir (or in the intermediate holding chamber, again where provided). In one set of embodiments the step of calculating the energy required for the heating means to heat a predetermined volume of the liquid from the upstream temperature to a desired final temperature comprises measuring the temperature of, or downstream of, the heating means, i.e. the apparatus comprises a temperature sensor sensitive to the temperature of, or downstream of, the heating means. Measuring the temperature of the heating means or the downstream temperature gives an indication of the residual energy in the apparatus, for example owing to the ambient temperature and/or the apparatus having been operated recently and therefore the heating element providing some residual heat, which can be factored into the calculation of the energy required to heat the predetermined volume to the desired final temperature. For example, if the apparatus contains some residual heat energy from a previous operation, the energy required for heating the predetermined volume to the desired final temperature will be lower than if the apparatus had not been used for a long period of time. Thus, for a heating means of fixed power, for example, the calculated period of "ON" time for energizing the heating means will be shorter.

The downstream temperature could be sensitive to any residual liquid in the apparatus, but preferably it is sensitive to the temperature of whatever means are used to transport liquid from the heating means to the dispensing outlet, e.g. a conduit or pipe. Thus, at least in some embodiments, the calculated energy includes the thermal capacity of the heating means and any other heat sinks downstream of the heating means. The calculated energy could also compensate for heat losses from the system, particularly if there is a pause between the first and second periods of time. The duration of the pause could be measured and used by the control means in the calculation of the calculated energy. Practically, however, the energy loss may be accounted for by an estimated, or previously calibrated, constant, e.g. 10% of the calculated energy.

The power supplied to the heating means could be varied, e.g. controlled by the control means, in order to match the power of the heating means to the flow rate of the liquid through the heating means. This could be used to ensure that the liquid temperature is kept at (or above) the predetermined initial temperature for the entirety of the first period, compared to having the average temperature of the liquid dispensed in the first period corresponding to the predetermined initial temperature. However, in one set of embodiments the power supplied to the heating means by the control means is constant (although there may be fluctuations in the mains power supply, as will be discussed below). This simplifies the calculation of the energy required.

The apparatus could comprise means for measuring the flow rate of the liquid through the heating means. If this measurement is fed to the control means it allows the control means to control the operation of the pump for the first and second periods of time, i.e. in order to dispense the predetermined volume of liquid. The means for measuring the flow rate could comprise a flow meter, either provided as a separate component or as part of the pump, e.g. the pump could be used to deduce the flow rate. The pump may, in some examples, be relied upon to deliver liquid at a substantially constant flow rate regardless of the liquid pressure (e.g. as set by a mains supply or upstream head of liquid in a reservoir). However, in one set of embodiments the apparatus comprises means for delivering a constant flow rate of the liquid through the heating means, e.g. a flow regulator. This could be provided by an electronic flow rate control, e.g. a valve, but preferably there is provided a flow regulator of the type described in WO 2012/114092, the contents of which are hereby incorporated by reference.

A constant flow rate allows for simpler control of the apparatus as the means for delivering the flow rate sets a constant flow rate of the liquid through the heating means that is preferably independent of the pressure delivered by the pump. For example, some pumps such as a solenoid pump tend to operate an elastomeric diaphragm rather than a piston and may deliver different flow rates depending on the liquid pressure. This may be achieved using a relatively inexpensive component such as a flow regulator. Thus the first and second periods of time can be calculated simply based on the volume of liquid to be dispensed in each of these periods, and then the predetermined volume of liquid is simply dispensed by operating the pump for a fixed period of time overall, i.e. the sum of the first and second periods of time. The means for measuring the flow rate of the liquid through the heating means or the means for delivering a constant flow rate of the liquid through the heating means is preferably located downstream of the pump and upstream of the heating means, i.e. between the pump and the heating means.

A constant flow rate also makes it easier to dispense the first volume of liquid at the predetermined initial temperature, e.g. the means for delivering a constant flow rate could be chosen to match the rate of heat transfer from the heating means into the liquid such that the first volume of liquid is dispensed at a relatively constant temperature over the first period of time. This may be set by the pump itself (e.g. a positive displacement pump) or by a flow regulator downstream of the pump (e.g. a solenoid pump). The constant flow rate is preferably between 100 ml/minute and 300 ml/minute, e.g. between 150 ml/min and 250 ml/min, and preferably about 170 ml/min, and this could be measured during calibration of the apparatus, for example. Alternatively the flow regulator could be preset with a reliable flow rate, e.g. suitable pressure-compensating constant flow valves are available from Netafim (www.netafim.com). Providing a means for delivering a constant flow rate also reduces the effect from variations in the flow rate from the pump with time, supply voltage, wear, etc.

As the total amount of energy required to be delivered by the heating means has been calculated and, in some embodiments, the flow rate of liquid through the heating means is known or calculated, it is not necessary to measure the final liquid temperature, e.g. to check that it has reached the predetermined initial temperature in the first period of time. All that is necessary for this is the measurement of the temperature upstream of the heating means, the calculation of the energy to be delivered to the predetermined volume of liquid and the flow rate of liquid through the heating means. As is discussed below, any fluctuations in the mains power supply that may affect operation of the heating means and/or pump can also be taken into account.

The predetermined initial temperature could be an average temperature of the liquid dispensed in the first period of time or the liquid could be dispensed at a constant predetermined initial temperature in the first period of time. However this is difficult to achieve, at least initially when the system is unlikely to be in equilibrium, and so there is always likely to be at least some minor temperature fluctuations in the dispensed liquid. Therefore the predetermined initial temperature could correspond to a minimum temperature, above which the liquid is dispensed in the first period of time. In a set of embodiments this may correspond to a sterilization temperature for the bottle and/or the powdered infant formula. Preferably the predetermined initial temperature is greater than 60° C., e.g. greater than 65° C., and further preferably greater than 70° C. The predetermined initial temperature could be set by a user, e.g. via an input on the apparatus, to allow it to be varied between operations or could be programmed into the apparatus. In one set of embodiments the predetermined initial temperature of the initially dispensed first volume of liquid is preset at around 95° C. This ensures sterilization of the powdered infant formula and is similar to the temperature of just-boiled water that is used conventionally. In general the predetermined initial temperature may be greater than the desired final temperature, i.e. the temperature of the first volume of liquid dispensed is greater than the temperature of the second volume of liquid dispensed.

In some embodiments the predetermined initial temperature may be substantially the same as the desired final temperature or not much higher than the desired final temperature. For example, in situations where the liquid temperature upstream of the heating means is not much lower than the desired final temperature, the calculated amount of energy to be delivered by the heating means may be relatively small and liquid may therefore be dispensed at about the same temperature during the first period of time while the heating means is energized and during the second period of time while residual heat is being removed. This may occur when the apparatus is operated in an environment having a relatively high ambient temperature, for example greater than 25° C., 30° C., 35° C. or even greater than 40° C. Where the liquid upstream of the heating means, for example in a reservoir, has a temperature that is already >35° C. then it can be difficult to achieve a predetermined initial temperature greater than 60° C. or 70 ° C. during the first period of time and subsequently attain a lower desired final temperature after dispensing the predetermined volume, unless the predetermined volume is large or the dispensing rate is very slow, because the residual heat cannot be sufficiently dissipated. Preferably the predetermined initial temperature is greater than ambient temperature, for example greater than 25° C., 30° C., 40° C., or 50° C., but it may not be as high as 70° C., 80° C., 90° C. or 95° C. For example, the heated liquid dispensed during the first period of time may have a temperature in the range of 50-70 ° C. In at least some embodiments a predetermined initial temperature may not be set or programmed at all. Whether the predetermined initial temperature exceeds a minimum temperature, or not, may simply depend on the starting temperature of the liquid upstream of the heating means as compared to the desired final temperature.

When viewed from a further aspect the invention provides a method of operating an apparatus comprising heating means and means for dispensing a predetermined volume of a warm liquid, said method comprising the steps of: measuring the temperature of the liquid upstream of the heating means; calculating an amount of energy required for the heating means to heat the predetermined volume of the liquid from the upstream temperature to a desired final temperature; calculating a period of "ON" time required for energization of the heating means to deliver the calculated amount of energy; energizing the heating means for the calculated period of "ON" time; dispensing a first volume of directly heated liquid from an outlet of the apparatus during a first calculated period of time, wherein the first period of time is at least partly contemporaneous with the calculated period of "ON" time; de-energizing the heating means; and dispensing a second volume of liquid from the outlet of the apparatus for a second calculated period of time subsequent to the first period of time, the second volume of liquid being indirectly heated by removing residual heat from the heating means, the first and second volumes together providing the predetermined volume, wherein the average temperature of the first and second volumes of the liquid is the desired final temperature after the predetermined volume has been dispensed.

When viewed from another further aspect the invention provides an apparatus for dispensing a predetermined volume of a warm liquid, comprising heating means, means for dispensing liquid, a temperature sensor sensitive to the temperature of the liquid upstream of the heating means, and control means arranged to: receive upstream temperature data from the temperature sensor, calculate the amount of energy required for the heating means to heat a predetermined volume of the liquid from the upstream temperature to a desired final temperature, calculate a period of "ON" time required for energization of the heating means to deliver the calculated amount of energy, energize the heating means for the calculated period of "ON" time, calculate a first period of time to dispense a first volume of directly heated liquid from an outlet of the apparatus, wherein the first period of time is at least partly contemporaneous with the calculated period of "ON" time, de-energize the heating means, and calculate a second period of time to subsequent to the first period of time to dispense a second volume of the liquid from the outlet of the apparatus that is indirectly heated by removing residual heat from the heating means, the first and second volumes together providing the predetermined volume; wherein the average temperature of the first and second volumes of the liquid is the desired final temperature after dispensing the predetermined volume.

As the calculated energy is that needed to heat the whole of the predetermined volume of liquid from the upstream temperature to the desired final temperature, the particular temperature profile of the liquid dispensed in the second period of time is not critical. As long as the flow rate of the liquid through the heating means is not too high then all the residual heat energy can be transferred from the heating means to the liquid while the dispensing of the second volume of the liquid in the second period of time is taking place. In practice this is not an issue, e.g. with a flow rate of less than 500 ml/min. Usually the control means does not need to calculate a maximum flow rate for each dispense operation, although it may be a value programmed or preset in the apparatus during factory calibration to limit the flow rate, e.g. in extreme circumstances.

The choice of pump and/or use of a flow restrictor between the pump and the heating means may determine a maximum flow rate. Where there is provided means for delivering a constant flow rate through the heating means, such as a flow regulator, this can be chosen to provide a flow rate below the maximum. Therefore in general the liquid dispensed in the second period of time will reach thermal equilibrium with the heating means at or before the end of the second period of time. In other words, it is preferable for all residual heat to be removed during the second period. However, the heating means could be energized for at least the calculated period of "ON" time, i.e. possibly for a period longer than the calculated period of "ON" time, or for an additional ON period at a later time contemporaneous with the second period of time. This would thus leave some residual heat energy in the heating means. The flow rate through the heating means would then need to be calculated more accurately in order to transfer the correct amount of heat energy from the heating means to the liquid flowing therethrough during the second period of time.

The desired final temperature could be any suitable temperature for the particular application of the apparatus. The apparatus may be used, for example, to dispense warm liquid for the preparation of foodstuffs such as powdered soup or cold remedies, or to infuse delicate beverage materials such as white tea or green tea (e.g. brewed at 65° C. to 85° C. rather than using just-boiled water). However in one set of embodiments, particularly suitable for the preparation of infant formula, the desired final temperature is between 27° C. and 47° C., preferably between 32° C. and 42° C., and further preferably around 37° C. The desired final temperature could be set by a user, e.g. via an input on the apparatus, to allow it to be varied between operations or it could be programmed into the apparatus. As discussed above, it is not necessary to continuously monitor the final temperature of the heated liquid or a temperature at the outlet owing to the calculation of the energy needed to heat the predetermined volume of liquid to the desired final temperature. However the apparatus may comprise temperature sensing means at the outlet that is sensitive to the temperature of the heated liquid. This can be used as a feedback check to monitor the temperature of the dispensed liquid and may be used by the control means to control the first and second periods of pump operation or even the pump speed (e.g. where this controls the flow rate of the liquid through the heating means rather than a flow regulator) and/or the energization of the heater (time and/or power) to fine tune the final temperature.

As the first period of time is at least partly contemporaneous with the calculated period of "ON" time, the energization of the heating means overlaps in time with the first operation of the pump. The first period of time could exactly correspond to the calculated period of "ON" time, i.e. they may be energized simultaneously. Thus in a set of embodiments the method comprises energizing the heating means to start the calculated period of "ON" time at substantially the same time as operating the pump to start the first period of time. Accordingly the calculated period of "ON" time may start at the same time as the first period of pump operation, without any preheating. The start of the calculated period of "ON" time may even be after the start of the first period of time, for example so that some of the first volume of liquid is dispensed before the heating means is energized. Such delayed heating might be used where the temperature of the liquid measured upstream of the heating means is above a certain threshold, such that a smaller amount of energy will be required to heat to the desired final temperature. However it may be easier in such circumstances to start the heating means at the same time as the pump and shorten the calculated period of "ON" time.

In one set of embodiments the start of the calculated period of "ON" time is prior to the start of the first period of time. Thus the heating means is energized before liquid is pumped therethrough, allowing the heating means to be preheated to or towards its operating temperature. This ensures that the heating means, e.g. comprising a heating element and a liquid flow conduit, is heated enough such that any residual liquid in the heating means and the initial volume of liquid pumped through the heating means is at the predetermined initial temperature, and avoids the risk that the initial volume of liquid dispensed is cold if the first period of time and the calculated period of "ON" time corresponded exactly. The method may therefore further comprise the step of energizing the heating means for a predetermined period before the first period of time starts.

The preheating time for which the heating means is energized before the pump is operated could be fixed. However in one set of embodiments the heating means is energized for a preheating period before operation of the pump until a predetermined preheat temperature is reached. This could be measured by the temperature sensor sensitive to the temperature of, or downstream of, the heating means (where provided). In the set of embodiments comprising a sheathed heating element and a liquid flow conduit provided adjacent to one another, the temperature sensor may be provided in good thermal contact with one or both of the sheathed heating element and the liquid flow conduit. For example, the temperature of the heating means may be measured by a temperature sensing means in thermal communication with both the heating element and the liquid flow conduit, e.g. as is described in the Applicant's published application WO 2013/024286, the contents of which are hereby incorporated by reference. The predetermined preheat temperature of the heating element may be greater than 200° C., e.g. 210° C. Owing to the temperature gradients in the apparatus, typically this would heat the liquid flow conduit to just below 100° C.

In the first period of time, the pump could be operated continuously so as to provide a constant flow. However the inventors have appreciated that when the liquid flows through the heating means at a typical flow rate, e.g. as provided by a flow regulator downstream of the pump, the rate of transfer of heat energy from the heating means to the liquid can be greater than the power of the heater and therefore the heating means may cool down as liquid flows therethrough, particularly when the predetermined initial temperature is suitable for sterilization, e.g. greater than 70° C. This causes the temperature of the dispensed liquid to vary considerably, i.e. to cool down, during the first period of time. To accommodate this phenomenon, the flow rate delivered to the heating means could be varied such that the rate of transfer of heat energy from the heating means to the liquid is matched to the power of the heater, e.g. by reducing the flow rate. Where liquid is pumped directly to the heating means without using a flow regulator then this may be achieved by adjusting the pump speed. However in one set of embodiments the pump is operated periodically during the first period of time, i.e. in bursts, to adjust the overall flow rate. This is particularly suited to embodiments that use a constant flow regulator between the pump and the heating means. Such pulsed operation allows the heating means to increase in temperature between the time(s) in which liquid is being pumped, so that the liquid pumped during the first period of time can be more accurately dispensed at the predetermined initial temperature.

The end of the first period of time may coincide with the end of the calculated period of "ON" time or even before it, i.e. the pump could stop pumping at or before the time at which the heating means is de-energized. However in one set of embodiments the end of the first period of time is after the end of the calculated period of "ON" time, i.e. preferably the pump continues to pump liquid after the heating means has been de-energized. This prevents overheating of the heating means.

As long as the second period of time starts after the first period of time, and preferably starts after the heating means has been de-energized, there are a number of different possibilities for the start of the second period of time. For example, the second period of time could occur immediately after the first period of time, with continuous operation of the pump. In these embodiments the start of the second period of time would generally be defined by the time at which the heating means is de-energized. Accordingly, the step of de-energizing the heating means may end the first period of time (e.g. where liquid is directly heated) and the pump may operate continuously to immediately start the second period of time (e.g. where liquid is indirectly heated by removing residual heat). There may not be any pause between the first and second periods of pump operation. For example, the apparatus may include means for adding infant formula milk powder (or other foodstuff(s) to be reconstituted) to the liquid as it is being dispensed, without user intervention being required.

However in one set of embodiments the pump is stopped between the first and second periods of time, i.e. there is a pause. This means that no liquid is being dispensed in this intermediate period of time and allows, for example, powdered infant formula to be added to a bottle and mixed with the first volume of liquid before the second volume of liquid is dispensed, or the bottle to be shaken or stirred if the powdered infant formula was added to the bottle before the first volume of liquid was dispensed. The pause may be between 30 s and 60 s, e.g. 45 s. This relatively short period of time limits the amount of heat energy lost from the heating means. In practice a pause of short duration, e.g. less than 60 s, may not affect the amount of residual heat remaining The duration of the pause could be predetermined and occur automatically. However in one set of embodiments the duration of the pause is determined by the user. For example, the user could initiate the second period of time, e.g. by pressing a button. This may allow a user to override a pre-programmed pause when desired to dispense the second volume more quickly.

It will be appreciated that the length of each of the first and second periods of time for pump operation is calculated taking into account the temperature of the liquid upstream of the heating means, which determines the amount of energy required to heat a predetermined volume of liquid to a desired final temperature. Typically the desired final temperature is warmer than ambient temperature, e.g. greater than 25° C., 30° C., 40° C., or 50° C. However such final temperatures may be achieved by directly heating a first volume of liquid that is the same as, or smaller than, the second volume of liquid that is indirectly heated by removing residual heat after the heating means has been de-energized. Accordingly the second volume of liquid may be greater than the first volume of liquid. It has been found that the second period of pump operation may act to make up the predetermined volume by removing substantially all residual heat from the heating means, which can take longer than the first period of direct heating. Accordingly the second period of time may be longer than the first period of time. In fact the second period of time is calculated to ensure an energy balance, so that the desired final temperature is accurately achieved for a given predetermined volume being dispensed.

The first volume of liquid may be between 20 ml and 100 ml, preferably between 20 ml and 60 ml. This is around 20% of the feed size (e.g. 270 ml-300 ml maximum) for infant formula. The second volume of liquid may be between 50 ml and 250 ml, preferably between 100 ml and 240 ml, i.e. in general the second volume of liquid may be greater than the first volume of liquid. Each of the amounts for the first and the second volumes of liquid could be selected by a user, e.g. via a user interface in which the user inputs a value or selects from a number of pre-programmed options, e.g. standard bottle sizes. However, in one set of embodiments it is the predetermined volume of liquid, i.e. the total volume of liquid dispensed which is selected by a user. The control means then calculates the first and second volumes of liquid, based on the desired final temperature and the predetermined initial temperature of the first volume of liquid. The predetermined volume of liquid may be between 50 ml and 350 ml, preferably between 60 ml and 300 ml, e.g. 200 ml may be typical for infant formula but of course the volume will depend on the age of the infant to be fed. The invention extends to an apparatus as described herein for dispensing a predetermined volume of warm liquid, preferably water, chosen from one or more of: 60 ml, 120 ml, 150 ml, 180 ml, 250 ml, 270 ml, 300 ml, 340 ml.

The pump could be any suitable pump for delivering the required flow rates of liquid through the apparatus. In one set of embodiments the pump comprises a solenoid pump. Such a pump is able, for example, to deliver a pressure of preferably greater than 0.5 bar and preferably up to 4 bar. Where provided, this allows the flow regulator, as discussed above, to deliver a constant flow rate, e.g. of 170 ml/minute. Such constant flow regulators typically need a minimum pressure, e.g. 0.5 bar, to operate and are therefore preferably provided in combination with a solenoid pump to pressurize the flow upstream of the regulator.

In another set of embodiments the pump comprises a positive displacement pump, such as a piston pump. Such pumps can operate at practically constant flow rates (averaged over time) across a wide range of liquid pressure. Where the pump can itself be relied upon to provide a constant flow of liquid to/through the heating means, then a flow regulator as mentioned above may be omitted.

It will be appreciated that other pump arrangements may fall within the scope of the present invention. The apparatus may not even comprise a distinct pump device. It is mentioned above that the apparatus could be directly connected, (e.g. permanently) to an external liquid supply, for example plumbed into a mains water supply. Where the apparatus is connected in-line with a liquid supply such as the mains water supply, it is envisaged that the "pump" may simply comprise a valve to control when liquid is dispensed from the external supply. In such embodiments the flow rate through the heating means may be regulated using a constant flow rate means, for example as already discussed above. In one set of embodiments the apparatus comprises a pressure relief valve arranged to vent excess pressure from the heating means, e.g. in the event of a blockage in or downstream of the heating means. The pressure relief valve could be placed downstream of the heating means, but preferably is located upstream of the heating means, e.g. between the reservoir and the heating means, as this does not interfere with the final dispensing of the heated liquid at the outlet of the apparatus. The pressure relief valve could vent to the atmosphere, e.g. a drain outside of the apparatus, or to a drip tray. Conveniently, however, the pressure relief valve vents back into the reservoir, where provided.

In one set of embodiments the control means receives data from the various inputs in the apparatus, e.g. the temperature and water level sensors, and uses this data to control the pump and/or the heating means, i.e. from the calculations it performs. The control means may comprise a microprocessor in data communication with the various components. As indicated above, the apparatus may be calibrated during its manufacture in a factory and/or by a user before its first operation. The values and relationships determined during calibration are preferably used by the control means to control the operation of the apparatus.

It is mentioned above that the local mains power supply voltage may be taken into account when the apparatus is calibrated before its first use, e.g. in the factory or by a user as part of an initial set-up process. While the heating means may be rated to provide a fixed nominal power output, this can be affected by differences in the mains power supply. For example, the mains supply in Europe is generally 230 V but in China it is 220 V instead. The apparatus may be calibrated for use in other countries, such as the USA where the mains power is only 120 V, or for the 100 V supply in Japan. However, even beyond this calibration there may be fluctuations in the mains power supply during use of the apparatus that can affect its performance, especially when seeking to dispense a predetermined volume of liquid at an accurate final temperature. In a set of embodiments it is therefore preferable for operation to include the step of measuring the mains supply voltage and further preferably adjusting operation of the heating means and/or of the pump to take into account the mains supply voltage.

In the UK the mains power supply is specified as 230 V (+10%, −6%) by EN 61000-4-14. Voltage fluctuations even within this range can have serious effects on the power output of the heating means and/or pump, as power is proportional to voltage squared. Some class 1 electrical equipment is designated as being sensitive to mains power fluctuations and needs to be connected to a protected mains power supply (e.g. using a constant voltage transformer), but domestic appliances in class 2 are intended to be directly connected to the mains supply and do not have any such protection. An apparatus according to the present invention is most likely a class 2 domestic appliance e.g. with a cable for direct connection to the mains power supply.

The mains supply voltage could potentially be predicted depending on the time of day (as fluctuations typically occur according to known usage patterns) but it is more accurate to actually measure the mains supply voltage. The control means may be arranged to measure the mains supply voltage in any suitable way. For example, the control means may include or be connected to a supply voltage sensor (e.g. as sold by Eaton Corp. or other suppliers). In a preferred set of embodiments the control means comprises a voltage measuring circuit connected to the mains power supply of the apparatus. The voltage measuring circuit is preferably part of, or connected to, a microprocessor of the control means that is arranged to adjust operation of the heating means and/or of the pump to take into account the mains supply voltage. The voltage measuring circuit may be an analogue circuit with an analogue-to-digital converter used to provide a digital input to the microprocessor that represents the measured voltage level.

The measured mains supply voltage could be used by the control means to adjust the power of the heating means so as to achieve the same power output regardless of fluctuations in the mains power. However, as is mentioned above, it is preferable that the control means does not adjust the power supplied to the heating means. The energy output of the heating means will therefore vary depending on fluctuations in the mains supply voltage. To ensure that the heating means delivers the calculated amount of energy required, the measured mains supply voltage is preferably taken into account when calculating the period of time required for energization of the heating means.

This is considered novel and inventive in its own right, and thus when viewed from a further aspect the present invention provides a method of operating an apparatus comprising heating means and a pump to dispense a predetermined volume of warm liquid, the method comprising the steps of: measuring the mains supply voltage provided to the heating means; measuring the temperature of the liquid upstream of the heating means; calculating the amount of energy required for the heating means to heat a predetermined volume of the liquid from the upstream temperature to a desired final temperature; calculating a period of time required for energization of the heating means to deliver the calculated amount of energy, taking into account the measured mains supply voltage; energizing the heating means for the calculated period of "ON" time; and operating the pump to dispense the predetermined volume of liquid.

According to a yet further aspect there is provided an apparatus for dispensing a predetermined volume of warm liquid, comprising heating means, a pump, a temperature sensor sensitive to the temperature of liquid upstream of the heating means, and control means arranged to: measure the mains supply voltage provided to the heating means; receive upstream temperature data from the temperature sensor; calculate the amount of energy required for the heating means to heat a predetermined volume of liquid from the upstream temperature to a desired final temperature; calculate a period of time required for energization of the heating means to deliver the calculated amount of energy, taking into account the measured mains supply voltage; energize the heating means for the calculated period of "ON" time; and operate the pump to dispense the predetermined volume of liquid.

It will be appreciated that using such a method or apparatus it is possible to adjust the heating process to compensate for fluctuations in the local mains power supply, e.g. that may happen at different times of the day, without needing to adjust the power supplied to the heating means. Furthermore, as it is a predetermined volume of liquid that is being heated rather than a continuous flow (e.g. as in a conventional beverage dispensing apparatus providing hot water for tea, coffee, etc.) the flow rate is not really linked to the final temperature to be achieved as long as the predetermined volume is accurately dispensed (and the calculated amount of energy is transferred effectively from the heating means).

According to embodiments of these further aspects of the invention the predetermined volume of warm liquid may be dispensed by one or more periods of operating the pump. It is envisaged that the pump may be operated before and/or after energizing the heating means i.e. for a period of time that is not contemporaneous with the calculated period of "ON" time. This may be used where the heating means comprises a batch heater rather than a flow heater. However in preferred embodiments the pump is operated during a first period of time that is at least partly contemporaneous with the calculated period of "ON" time to dispense a first volume of the liquid, the heating means is de-energized, and the pump is subsequently operated for a second period of time to dispense a second volume of the liquid, wherein the first and second volumes together provide the predetermined volume of liquid. As is discussed above, the pump may operate continuously, so that the second period of time immediately follows the first period of time, or there may be a pause in pump operation between the first and second periods of time.

Preferably, after dispensing the predetermined volume of liquid the average temperature of the first and second volumes is the desired final temperature. Accuracy of the final temperature is ensured as a result of measuring the actual mains supply voltage provided to the heating means and taking this into account when calculating the time period for which the heating means is energized.

Variations in the mains supply voltage may also affect the output of the pump, which can be relevant to embodiments of any of the aspects of the invention. If the pump delivers liquid directly to the heating means, e.g. without a constant flow regulator between the pump and the heating means, then the flow rate will depend on pump speed. In such embodiments the measured mains supply voltage may be taken into account (alternatively or in addition) when calculating the flow rate delivered by the pump and/or the period(s) of time for pump operation. The speed and/or the period of operation of the pump may be controlled accordingly. This can help to ensure that the predetermined volume of warm liquid is accurately dispensed, rather than the volume being over- or under-dispensed as a result of fluctuations in the pump speed. However in a preferred set of embodiments a constant flow regulator is used (as described above) to set a constant flow rate and therefore changes in the pump power do not need to be taken into consideration.

The mains supply voltage could be measured regularly and this information used to update a calculation of the heating time period. However it is preferable to perform a single measurement of the mains supply voltage, e.g. at the start of a dispensing cycle, so as to calculate the heater energization period once and then proceed to heat and dispense the predetermined volume. A dispensing cycle, and in particular the energization period of the heating means, will typically only last one or two minutes or less for the predetermined volumes of liquid e.g. water typical for making infant formula milk. This means that there is no need for a closed feedback loop with adjustment of the heating period after the mains supply voltage has been measured at the start. Of course this helps to simplify the calculations performed by the control means while also ensuring accuracy in the heating process.

As used herein the term sterilization is intended to refer to the process of killing potentially harmful bacteria and germs. It should not be interpreted as implying a particular level of sterility—e.g. meeting a definition of clinically sterile or indeed any other particular definition or effectiveness.

BRIEF DESCRIPTION OF THE DRAWINGS

Certain embodiments of the invention will now be described, by way of example only, and with reference to the accompanying drawings in which:

FIG. 12 is a plot showing operation and temperature profiles when dispensing a 330 ml volume of heated liquid according to the cycle of FIG. 10.

DETAILED DESCRIPTION OF THE INVENTION

Figure 1:
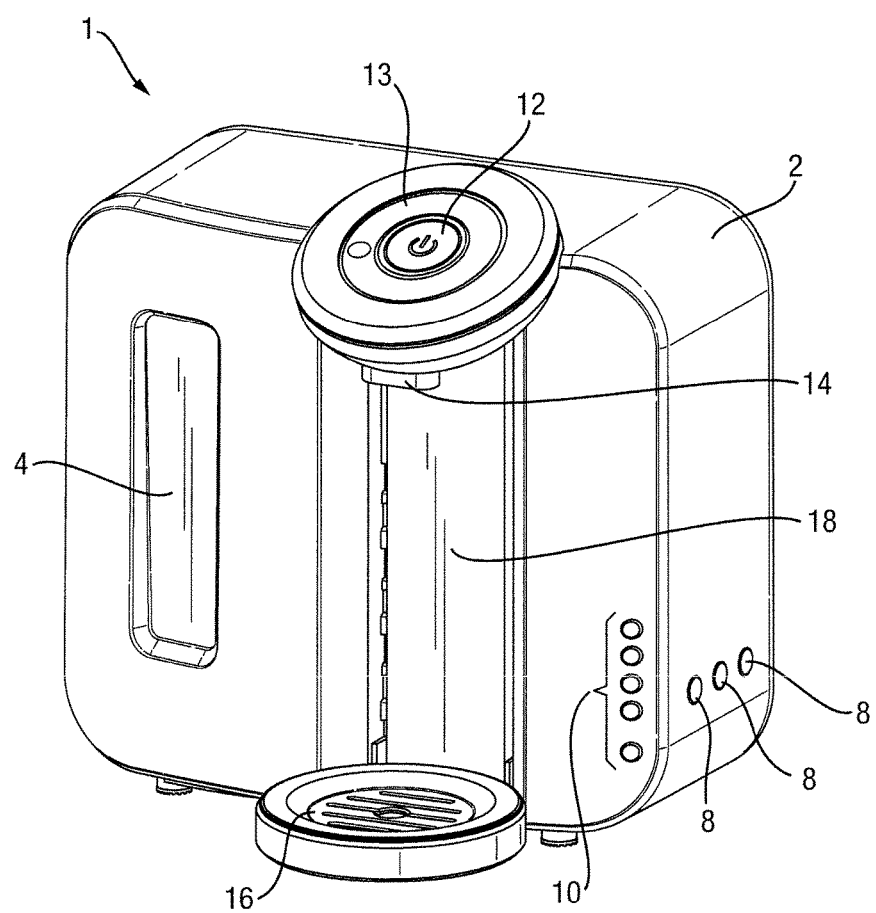
FIG. 1 is a perspective view of an appliance in accordance with an embodiment of the invention.

FIG. 1 is a perspective view of an embodiment of the invention and shows an appliance 1 for dispensing warm water for the preparation of infant formula milk from powdered infant formula. The appliance is shown with an outer housing 2, in which is provided a window 4 for viewing the water level in the internal water tank 6 (see FIGS. 2 and 3). On the right hand side of the housing 2 there are three user input buttons 8. These are used to set the timer when a new water filter has been installed, to run a cleaning cycle of the appliance 1, and to run a descaling cycle. A panel of LEDs 10 display various operational states of the appliance 1, i.e. a warning light to indicate that the water filter need changing. An on-off button 12 and rotatable dispense volume dial 13 are provided above the dispensing outlet 14, which is located above a drip tray 16. A baby bottle or cup 17 (shown in FIG. 5) can be placed on the drip tray 16 such that in use the heated water is dispensed into the bottle or cup 17, with the outer housing 2 having a vertically extending recess 18 between the drip tray 16 and the dispensing outlet 14 to accommodate the bottle 17.

Figure 2:
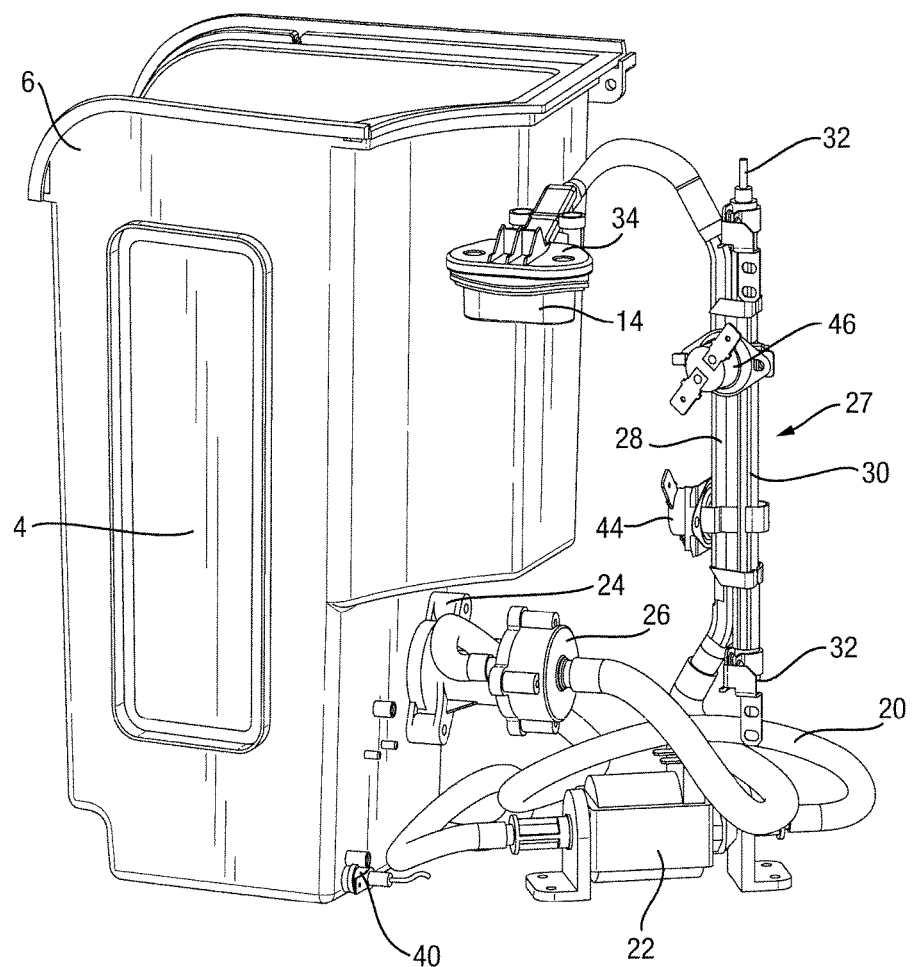
FIGS. 2 and 3 are front and rear perspective views of the major internal components of the appliance shown in FIG. 1.
Figure 3:
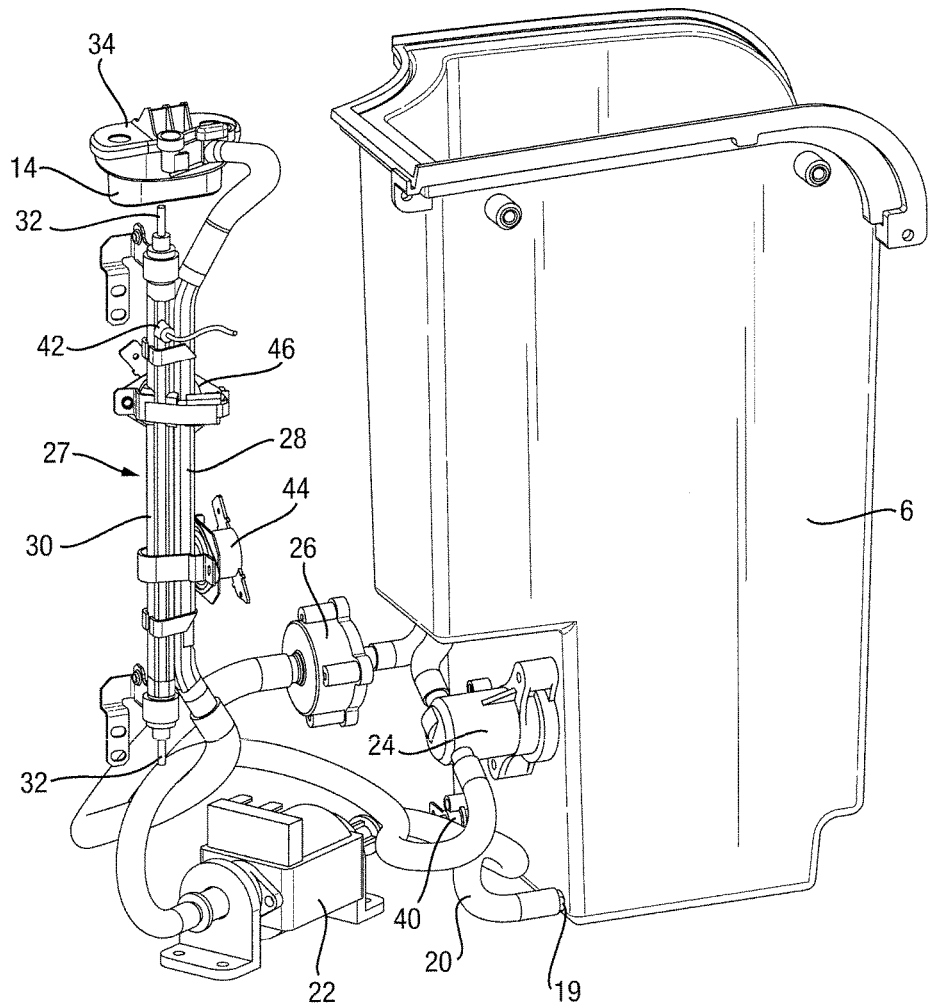

The major internal components of the appliance 1 can be seen in the perspective views of FIGS. 2 and 3, from the front and rear of the appliance 1 respectively, in which the outer housing 2 has been removed. The internal water tank 6 with its window 4 is shown on the left, and has an outlet 19 towards its base which feeds a water conduit 20. The water conduit 20 passes first through a pump e.g. solenoid pump 22 and then past a pressure relief valve 24 and through a pressure compensating constant flow valve 26. The pressure relief valve 24 vents back into the water tank 6 in the event of the water conduit 20 becoming over-pressurized. A suitable pressure compensating constant flow valve 26 is available from Netafim (www.netafim.com).

After the pressure compensating constant flow valve 26, the water conduit 20 passes to a flow heater 27 in which a water flow tube 28 is brazed to a sheathed heating element 30. Cold tails 32 at either end of the sheathed heating element 30 connect it to a power supply (not shown). The water flow tube 28 passes to the final section of the water conduit 20 which then feeds to a dispensing head 34 and the outlet 14. The dispensing head 34 may take the form of an intermediate chamber receiving the liquid and/or vapor that exits from the flow heater 27. The dispensing head 34 may help to enable any steam to separate from the heated liquid so that there is a controlled flow out of the outlet 14 without any spitting.

Figure 4:
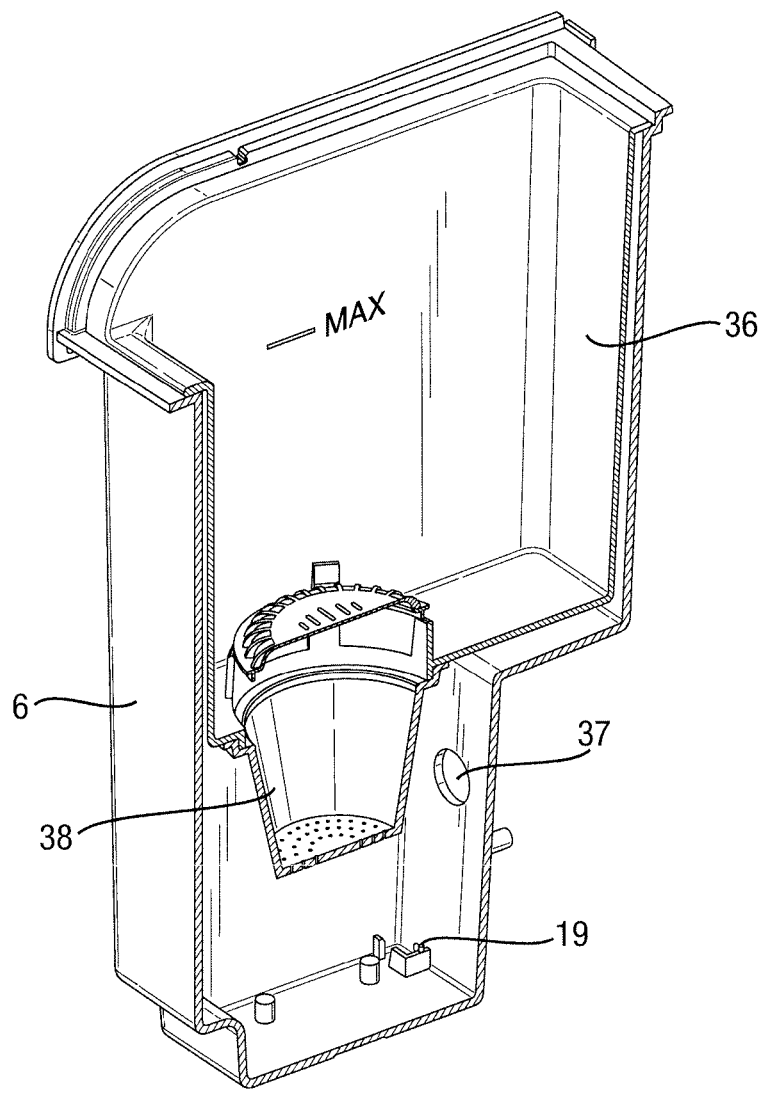
FIG. 4 is a cross-sectional view of the water tank shown in FIGS. 2 and 3.

The inside of the water tank 6 can be seen in the cross-sectional view of FIG. 4 which shows that a water hopper 36 is provided inside the top of the water tank 6. It is this water hopper 36 into which untreated water, e.g. tap water, is placed. An anti-microbial filter 38 is located at the bottom of the water hopper 36 to allow water to drain into the bottom of the water tank 6 before it exits the tank via the outlet 19. Also can be seen is the inlet 37 into the water tank 6 from the pressure relief valve 24.

Referring back to FIGS. 2 and 3, a number of temperature sensors are placed at various points around the heating system. First a temperature sensor e.g. negative temperature coefficient thermistor 40 protrudes through the wall of the water tank 6 to sense the temperature of the filtered water in the bottom of the water tank 6. A second temperature sensor e.g. negative temperature coefficient thermistor 42 is placed towards the exit end and on the outside of the sheathed heating element 30. Also, two bimetallic actuators e.g. half inch discs or thermal fuses 44, 46 (or other temperature sensing means) are provided on the outside of the flow heater 27, one in contact with just the water flow tube 28 and the other in contact with both the sheathed heating element 30 and the water flow tube 28. The two half inch discs or thermal fuses 44, 46 protect against the sheathed heating element 30 overheating. Such an arrangement of temperature sensing means in thermal communication with both the heating element 30 and the water flow tube 28 is also described in the Applicant's published application WO 2013/024286.

Figure 5:
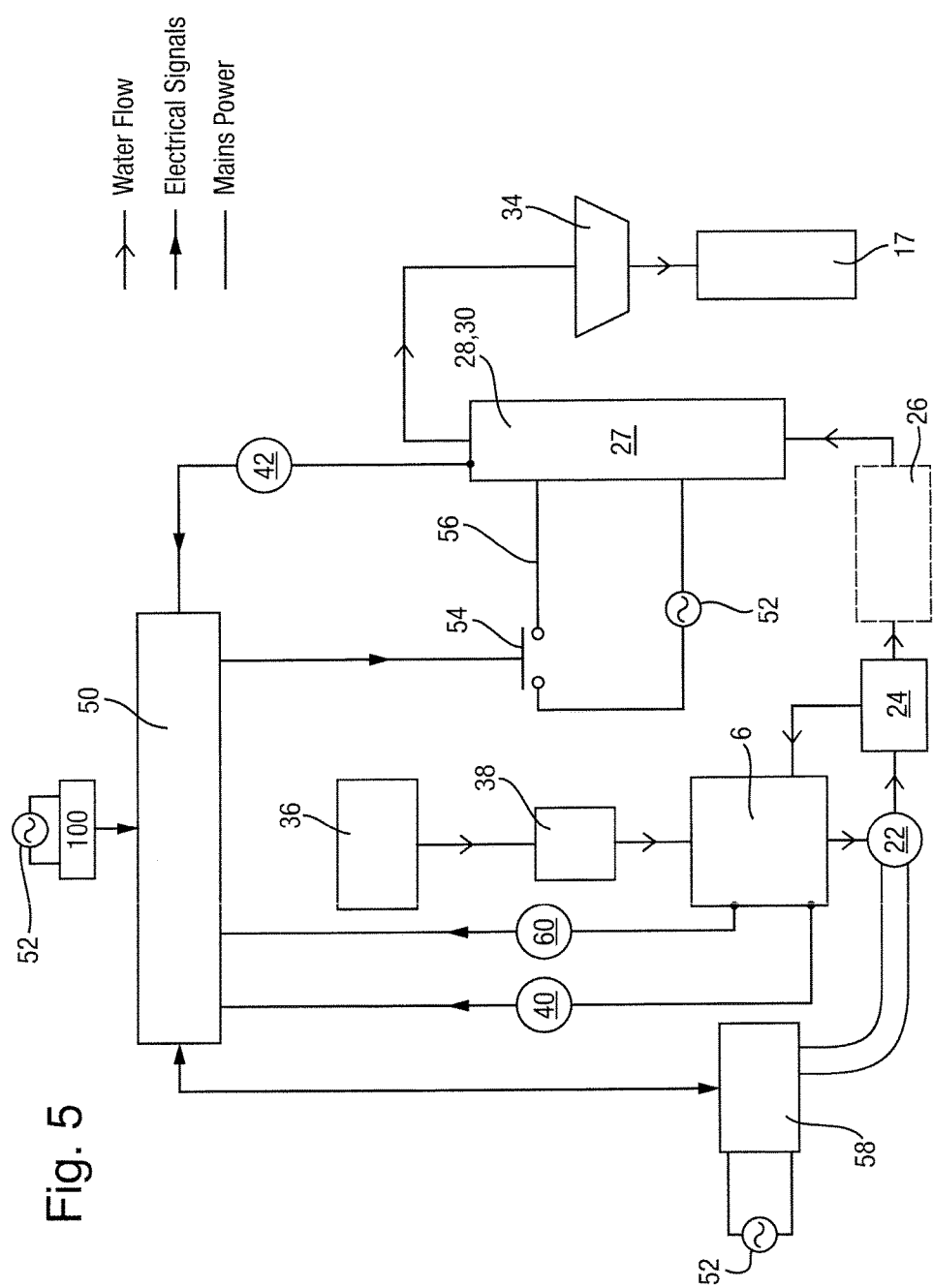
FIG. 5 is a schematic diagram showing the flow of water, power and electrical signals through the appliance.

The main components of the appliance 1 can also be seen in schematic form in FIG. 5, in which the flow of water, electrical signals and power is also shown. All the components are directly or indirectly controlled by an electronic controller 50 which receives electronic signals from various components and controls the power delivered to the sheathed heating element 30 and the solenoid pump 22. The electronic controller 50 is connected to a mains power supply 52 via a voltage measuring circuit 100. The sheathed heating element 30 is also connected to the mains power supply 52, with this being controlled by the electronic controller 50 via a switch 54 in the heater power supply circuit 56. In addition the pump 22 is connected to the mains power supply 52, with this being controlled by the electronic controller 50 via a pump power control 58.

The electronic controller 50 receives electrical signals from the negative temperature coefficient thermistor 40 in the water tank 6 and the second negative temperature coefficient thermistor 42 on the sheathed heating element 30, as well as from the pump power control 58 and a water level sensor 60 (not shown in FIGS. 2 and 3) which detects that a minimum fill level in the water tank 6 has been reached.

In accordance with other embodiments the solenoid pump 22 may be replaced with another kind of pump, for example a positive displacement pump 22' such as a piston pump. The pressure compensating constant flow valve 26 may be omitted, especially where the pump 22' is able to deliver a substantially constant flow rate through the flow heater 27 despite variations in water pressure. Yet other embodiments may omit a pump altogether, relying instead on a direct connection to an external supply such as the mains water supply and using a constant flow valve or regulator to ensure that the flow rate through the heater is known.

Figure 6:
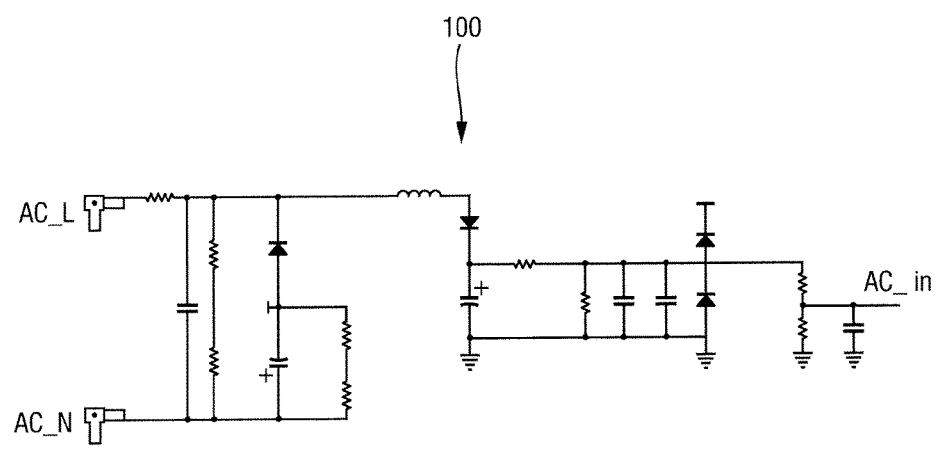
FIG. 6 is a voltage measuring circuit diagram.

FIG. 6 provides an example of a suitable voltage measuring circuit 100 connected between the live AC_L and neutral AC_N poles of the mains power supply 52 for the appliance 1. The circuit 100 measures the analogue voltage level AC_in and provides this to an A/D converter of the electronic controller 50 to give a digital input. The supply voltage V_in used by the electronic controller 50 is proportional to this digital input.

Operation of the apparatus according to a first set of embodiments will now be described with further reference to FIGS. 7-9.

When the apparatus starts a new dispensing cycle, it first conducts a preheating phase. The sheathed heating element 30 is turned on. The measured supply voltage V_in is used to calculate the instantaneous heating element power Q_dot according to Equation 1:

$$Q\_dot=((V\_in)^2/(V\_cal)^2) \times Q\_dot\_cal \qquad (\text{Eq. 1})$$

where V_cal and Q_dot_cal are the calibrated values of the heating element voltage and heating element power as determined during an initial calibration of the appliance (either after manufacture or when the appliance is first used). The appliance therefore accounts for variations in the mains supply voltage 52 every time it runs a dispensing cycle. Once the supply voltage V_in has been measured it is not monitored again during the same dispensing cycle.

The electronic controller 50 then calculates the energy needed to heat a predetermined volume of liquid Vol_feed to a desired final temperature T_feed. The liquid volume Vol_feed may be set or selected a user via the input dial 13. The final temperature T_feed may be set or selected by a user, but for a baby formula appliance 1 it is typically pre-programmed e.g. T_feed =37° C. The temperature, T_tank, of water in the tank 6 is measured by the negative temperature coefficient thermistor 40 and provided to the electronic controller 50. Of course the ambient temperature for water in the tank 6 will vary depending on the ambient conditions. The total energy Q_total needed to heat the predetermined volume Vol_feed to the desired final temperature T_feed can then be calculated according to Equation 2:

$$Q\_total=Vol\_feed \times Cp\_water \times \Delta T \times K1 \qquad (\text{Eq. 2})$$

where $\Delta T=T\_feed-T\_tank$, Cp_water is the specific heat capacity of the liquid being heated, and K1 is a compensation factor for heat losses. A typical value for K1 can be empirically determined from factory testing or calibration of the apparatus, and pre-programmed into the controller.

The predetermined volume of liquid Vol_feed is dispensed in two stages, i.e. Vol_feed=Vol_initial+Vol_cold. The first volume V_initial is dispensed at a temperature T_initialdispense>70° C. to "sterilize" the milk powder in the bottle 17. The second volume V_cold is dispensed to remove the residual heat energy from the sheathed heating element 30 to bring the overall volume Vol_feed to the desired final temperature e.g. T_feed=37° C.

It is necessary to preheat the sheathed heating element 30 to ensure that the whole of the initial dispense volume Vol_initial is dispensed hot enough. The sheathed heating element 30 is heated to a nominal target temperature e.g. T_target=210° C. to ensure that it is hot (due to the temperature gradients the water flow tube 28 should be just below 100° C. at this point). The actual temperature, T_element, of the sheathed heating element 30 is measured by the negative temperature coefficient thermistor 42 on the sheathed heating element 30. The energy needed for preheating Q_preheat is calculated according to Equation 3:

$$Q\_preheat=m \times Cp \times (T\_target-T\_element) \qquad (\text{Eq. 3})$$

where Cp is the specific heat capacity of the heater and m is the mass of the heater.

The preheat time t_preheat is then given by Equation 4:

$$t\_preheat=Q\_preheat/Q\_dot \qquad (\text{Eq. 4})$$

The stored energy Q_stored in the system must be taken into account when calculating the total "ON" time (t_heater) for energizing the sheathed heating element 30. This is calculated according to Equation 5:

$$Q\_stored=m \times Cp \times (T\_element-T\_tank) \times K2 \qquad (\text{Eq. 5})$$

where K2 is a compensation factor to take account of heat losses etc. which may be empirically determined and pre-programmed into the electronic controller 50. The factor K2 may be used to tune this part of the process so that the electronic controller 50 can abort a dispensing operation if the sheathed heating element 30 is detected to have overheated by one or both of the half inch discs 44, 46 on the flow heater 27.

The calculated period of "ON" time, t_heater, for energizing the sheathed heating element 30 is then calculated according to Equation 6:

$$t\_heater = (Q\_total - Q\_Stored)/Q\_dot \quad (Eq. 6)$$

The first period of pump operation is required to dispense the first volume V_initial of heated liquid and this is calculated according to Equation 7:

$$Vol\_initial = Q\_total/(Cp\_water \times (T\_initialdispense - T\_tank) \times K1) \quad (Eq. 7)$$

where T_initialdispense is preset in the electronic controller 50 at a value of e.g. 95° C.

The two periods of time for pump operation can then be calculated according to Equations 8 and 9:

$$t\_pump1 = Vol\_initial/Flow\ rate \quad (Eq. 8)$$

$$t\_pump2 = Vol\_cold/flow\ rate \quad (Eq. 9)$$

where the flow rate is that of the liquid entering the flow heater 27 as set by the pressure compensating constant flow valve 26. The flow rate is another value that may be calibrated for each appliance (either after manufacture or when the appliance is first used).

Figure 7:
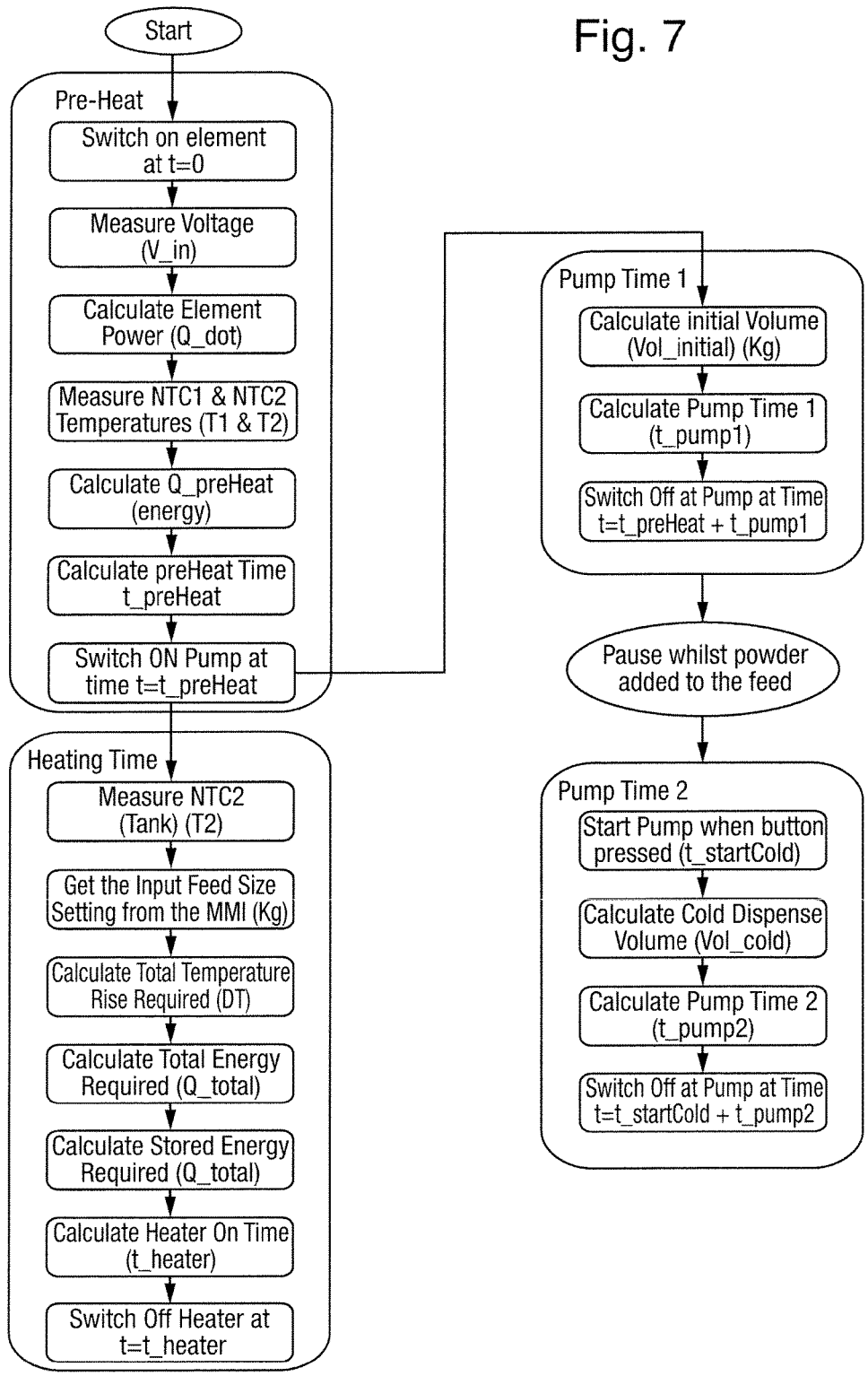
FIG. 7 is flow chart outlining the main steps involved in a complete dispensing cycle according to a first embodiment.
Figure 8:
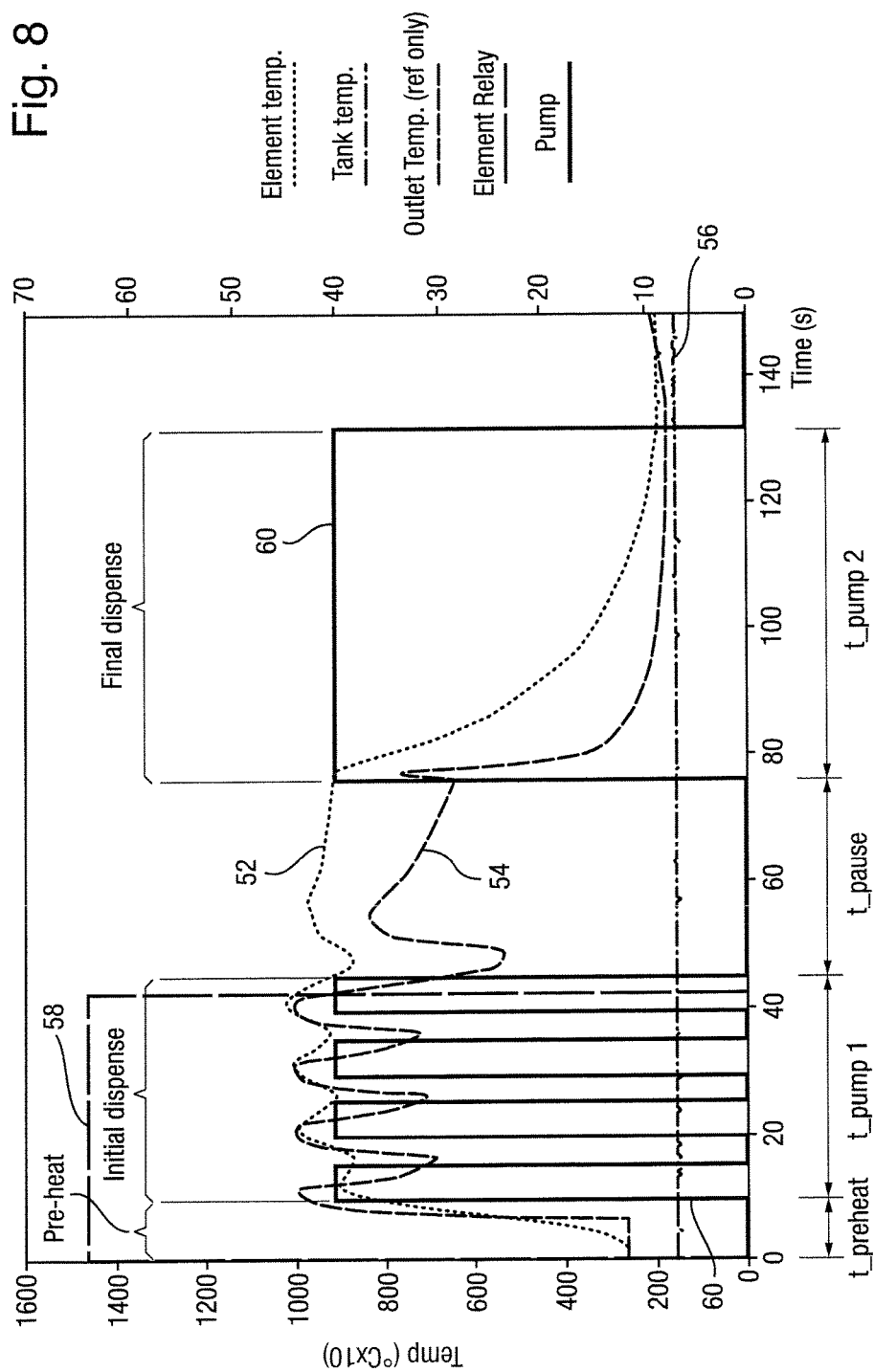
FIG. 8 is a plot of the operation of the appliance.

FIG. 7 is a flow chart outlining the main steps involved in a complete dispensing cycle. It can be seen that the process starts by measuring the mains supply voltage V_in at that time so as to make an accurate calculation of the power Q_dot of the sheathed heating element 30. The electronic controller 50 then takes readings from the negative temperature coefficient thermistor 40 (NTC1) in the water tank 6 and the second negative temperature coefficient thermistor 42 (NTC2) on the sheathed heating element 30. From these inputs it is possible to calculate the preheat time before the pump 22 is operated for a first initial dispensing period, the time period for energization of the sheathed heating element 30, and the second period of pump operation to dispense the full volume of liquid required to make the infant feed in the bottle 17. The electronic controller 50 may be programmed to pause for a set period of time, t_pause, e.g. 30 s, 40 s, 50 s or 60 s, to allow a user to add infant formula powder to the initially dispensed water, or to stir the feed if the formula powder was already in the bottle 17. However the appliance 1 may be provided with a button or other input allowing a user to start the second dispensing period on demand.

As is mentioned above, the flow rate of liquid entering the flow heater 27 is set by the pressure compensating constant flow valve 26 so as to have a constant value (e.g. 170 ml/min) regardless of any variations in the pump speed e.g. due to voltage fluctuations or as a result of age-related wear. Under certain circumstances it may be necessary to reduce the flow rate to provide the desired dispense temperature and this may be achieved by pulsing the pump on and off FIG. 8 shows a plot of the operation of the sheathed heating element 30 and the pump 22 overlaid on the temperature profiles sensed for the sheathed heating element 30 i.e. T_element 52, and the outlet temperature 54 measured at the dispensing head of the appliance. Also shown is the heater energization state 58 and the pump operation state 60. The starting temperature 56 of water in the tank 6 is constant e.g. T_tank=18° C. It can be seen that the temperature 54 measured at the dispensing head has an average value of around 85 □C as the first volume of water V_initial is dispensed at this temperature T_initialdispense during the first period of pump operation t_pump1. The outlet temperature 54 then drops and rises again during the pause between the pump operation periods, as it begins to move into thermal equilibrium with the system and its stored heat. When the second period of pump operation, t_pump2, begins, there is a small volume of warm water dispensed through the outlet that has been sitting in the water flow tube 28, but this is quickly followed by most of the volume Vol_cold of unheated water that is pumped through during the period t_pump2. The outlet temperature 54 rapidly falls to match the ambient water (e.g. at 18° C.) that is being pumped through without any heating. The two volumes of water that are dispensed into the bottle 17 mix to provide the predetermined volume V_feed at the desired final temperature T_feed (e.g. set at 37° C.).

Figure 9:
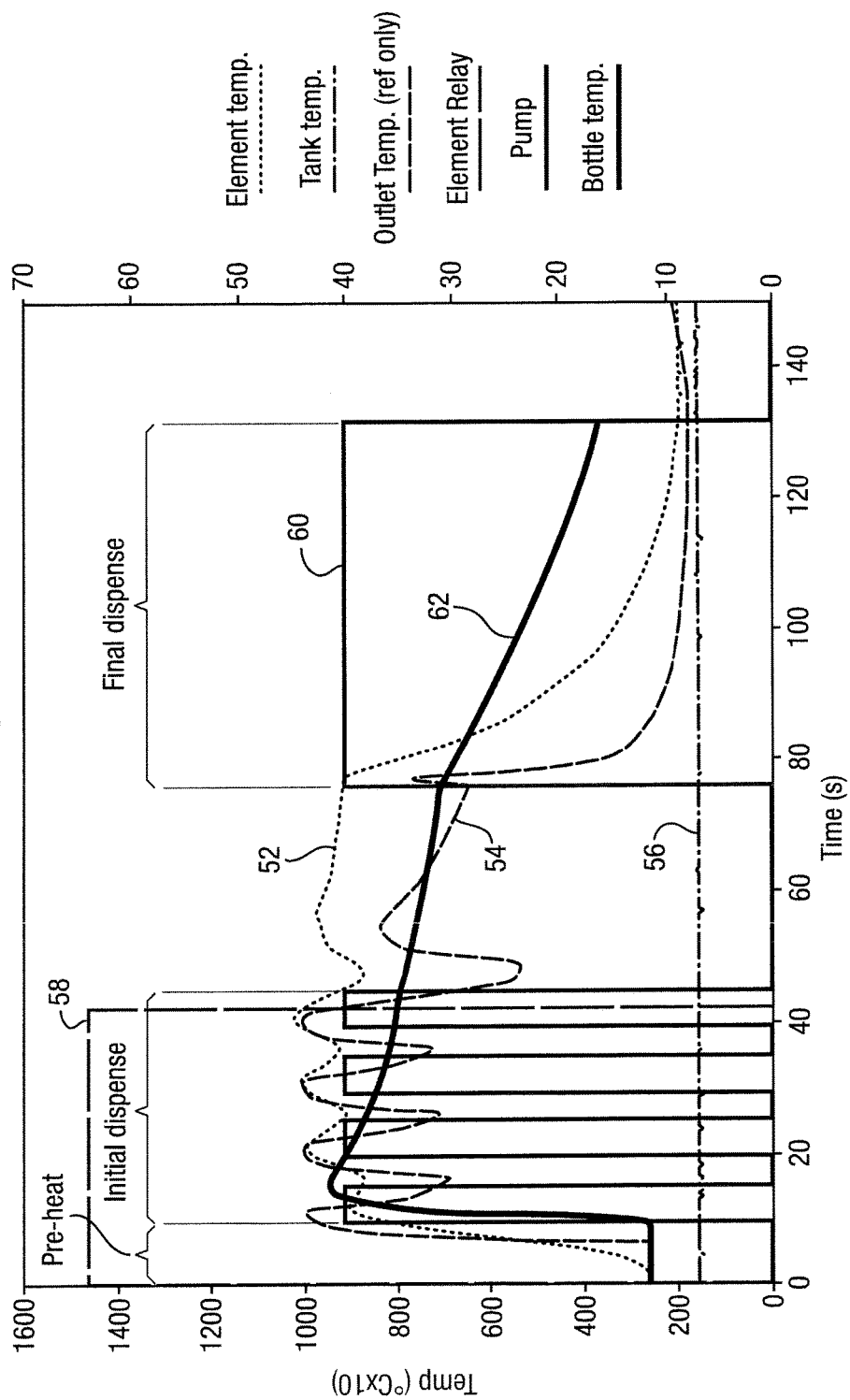
FIG. 9 is a plot showing a temperature profile for water in the bottle.

FIG. 9 shows a temperature profile 62 for the dispensed water in the bottle throughout the operational cycle of the appliance. After the pump 22 is energized initially the water temperature very quickly rises to about 95° C. At the end of the first period of pump operation, t_pump1, the first volume of water, V_initial, has an average temperature of about 80° C. and this remains above 70° C. during the pause, t_pause, when the powdered infant formula is added to the bottle, ensuring sterilization of the powder. As the cooler water is dispensed during the second period of pump operation, t_pump2,the temperature 62 of the water in the bottle falls, reaching a final average of about 37° C. when the final volume of the water has been dispensed to make the overall volume, Vol_feed.

As all the energy Q_dot input by the sheathed heating element 30 is used to heat the system it is not necessary for the appliance to measure the final water temperature T_feed, which can simply be calculated from Equation 10:

$$T\_feed = T\_tank + Q\_dot/(m\_feed \times Cp\_water) \quad (Eq. 10)$$

where m_feed is the mass of the overall volume Vol_feed of liquid in the bottle 17.

Figure 10:
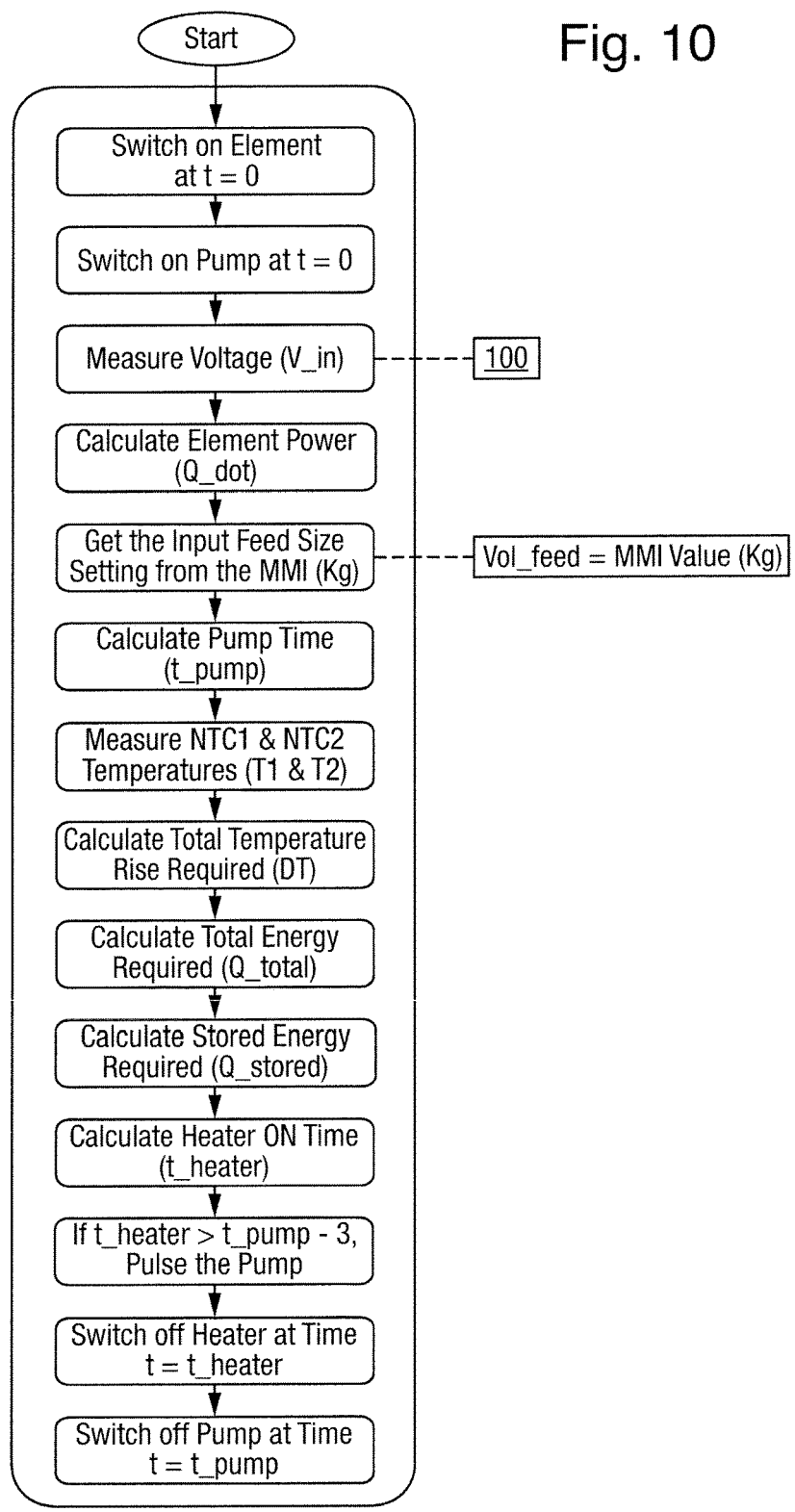
FIG. 10 is another flow chart outlining the main steps involved in a complete dispensing cycle according to a second embodiment.

Operation of the apparatus according to a second set of embodiments will now be described with further reference to FIGS. 10-12. The flow chart seen in FIG. 10 shows the steps that may be taken when the apparatus is operated to continuously dispense a predetermined volume of warm liquid Vol_feed having a desired final temperature of T_feed e.g. 37° C. In this scenario the apparatus is not used to dispense a separate first volume V_initial at a particular predetermined initial temperature, i.e. no "hot shot" at 70° C. or higher. However, as can be seen from the heating profiles of FIGS. 11 and 12, some of the liquid may be dispensed at such temperatures during a first phase of operation but there is no pause for a user to knowingly mix infant milk formula with the liquid while it is at this temperature.

According to FIG. 10 the heating element 30 is energized at substantially the same time as the pump 22, i.e. there is no preheating of the flow heater 27. As before, a voltage compensation circuit may be used to measure the voltage V_in applied to the flow heater 27. The electronic controller 50 calculates the heating element power according to Eq. 1 and then calculates the predetermined volume Vol_feed from the feed size (kg) input at the user interface MMI. The total energy Q_total needed to heat the predetermined volume Vol_feed to the desired final temperature T_feed can then be calculated according to Eq. 2. As Vol_feed is to be dispensed continuously, the time period for pump operation t_pump can simply be calculated according to Equation 11:

$$t\_pump = Vol\_feed/flow\ rate \quad (Eq. 11)$$

where the flow rate is that of the liquid entering the flow heater 27. This flow rate may be set by an upstream pressure compensating constant flow valve 26, where provided, or it may be a known constant of the pump 22'.

The electronic controller 50 takes readings from the NTC1 thermistor 40 in the water tank 6 and the NTC2 thermistor 42 mounted on the heating element 30 to give temperatures T1 (=T_tank) and T2 (=T_element). The total temperature rise required to reach the desired final temperature T_feed e.g. 37° C. is DT or ΔT=T_feed−T1. The total energy required Q_total is then calculated using Eq. 2. For example, Cp_water=4180 and losses K1=1.1 (initial value of 10%). In order to take into account any heat energy stored in the system, the controller 50 also calculates G_stored using Eq. 5. The heater ON time t_heater can then be calculated from Eq. 6.

The pump 22, 22' may be operated continuously or the liquid may be dispensing substantially continuously using a pulsed pump operation. For smaller volumes of liquid, the heater ON time t_heater may be almost as long as the pump ON time t_pump, at a constant flow rate, so the controller 50 checks whether pulsed pump operation is required, e.g. if t_heater>t_pump−3s. The flow heater 27 is de-energized after the time t_heater has lapsed. The pump is operated (continuously or in a pulsed fashion) until t_pump has lapsed and residual heat has been removed such that Vol_feed has the desired temperature T_feed.

Figure 11:
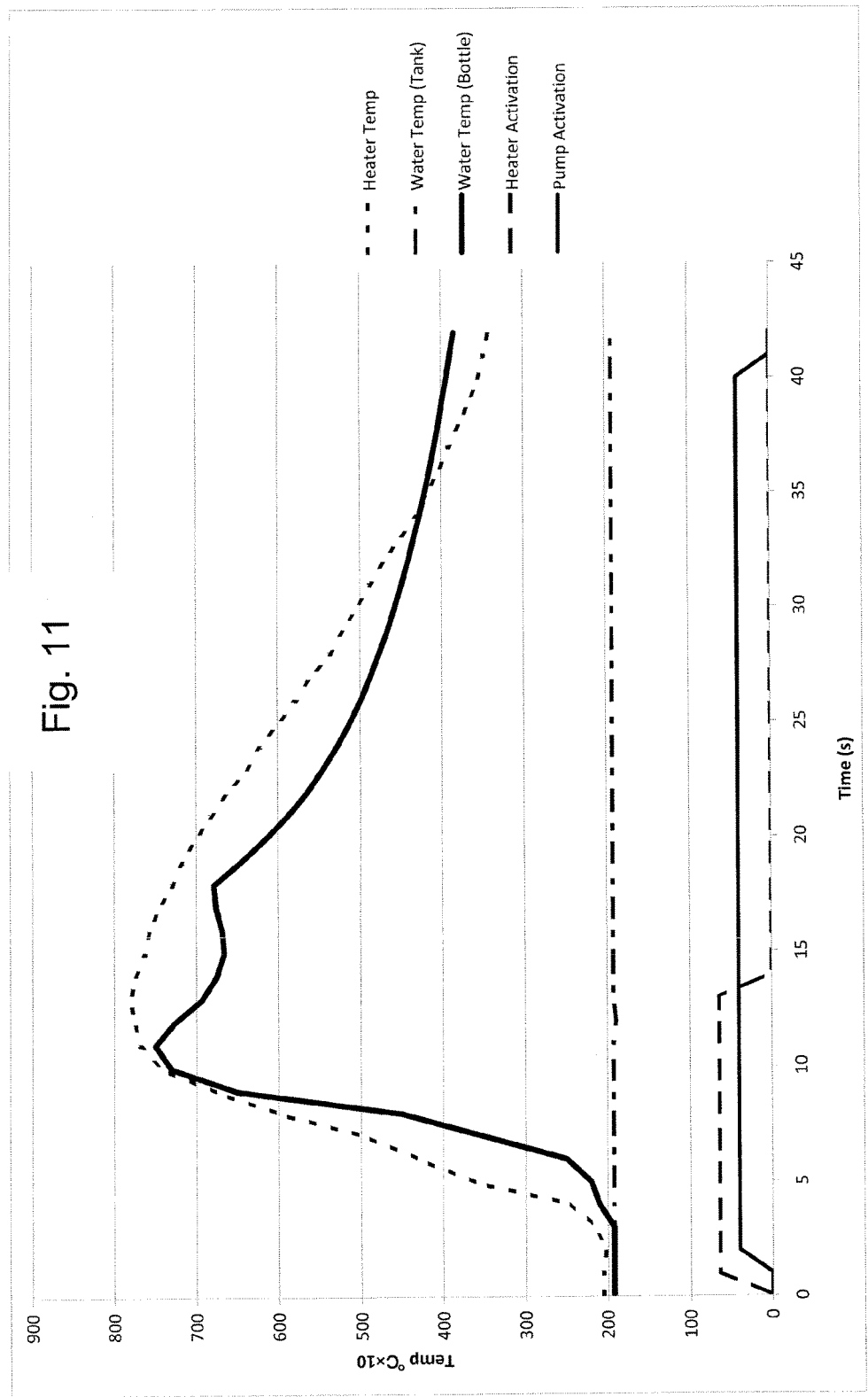
FIG. 11 is a plot showing operation and temperature profiles when dispensing a 120 ml volume of heated liquid according to the cycle of FIG. 10.

FIGS. 11 and 12 shows the activation profiles for the heater 27 and pump 22, 22', as well as the temperature profiles for the water in the tank T_tank (measured by NTC1), the heater T_element (measured by NTC2) and the temperature of heated liquid being dispensed into a bottle at the outlet. FIG. 11 shows the profiles for Vol_feed=120 ml and FIG. 12 shows the profiles for Vol_feed=330 ml.

It will be appreciated by those skilled in the art that the embodiments described above are merely examples of how the principles of the invention can be employed and there are many possible variants within the scope of the invention. For example, the principles of the invention could be used to produce water or other liquid at a different temperature and for a different purpose than the preparation of infant formula milk. Moreover, the particular type of heater shown is not essential and any other flow heater or batch heater could be used instead. Furthermore, water could be supplied from a plumbed-in source, e.g. the mains water supply, rather than from a hopper within the appliance.

What is claimed is:

1. A method of operating an apparatus comprising a heater and a pump to dispense a predetermined volume of a warm liquid, said method comprising the steps of:
   measuring the temperature of the liquid upstream of the heater;
   calculating an amount of energy required for the heater to heat the predetermined volume of the liquid from the upstream temperature to a desired final temperature;
   calculating a period of "ON" time required for energization of the heater to deliver the calculated amount of energy;
   energizing the heater for the calculated period of "ON" time;
   operating the pump during a first period of time to dispense a first volume of heated liquid at or above a predetermined initial temperature from an outlet of the apparatus, wherein the first period of time is at least partly contemporaneous with the calculated period of "ON" time;
   de-energizing the heater; and
   operating the pump for a second period of time subsequent to the first period of time, the second period of time being calculated such as to dispense a second volume of the liquid from the outlet of the apparatus so as to remove substantially all residual heat from the heater, the first and second volumes together providing the predetermined volume heated by the calculated amount of energy,
   wherein the average temperature of the first and second volumes of the liquid is the desired final temperature after the predetermined volume has been dispensed.

2. A method as claimed in claim 1, wherein the heater comprises a flow heater in which liquid is permitted to enter and exit the heater while heating is taking place.

3. A method as claimed in claim 1, wherein the step of calculating the energy required for the heater to heat a predetermined volume of the liquid from the upstream temperature to a desired final temperature comprises measuring the temperature of, or downstream of, the heater.

4. A method as claimed in claim 1, further comprising delivering a constant flow rate of the liquid through the heater.

5. A method as claimed in claim 1, wherein the pump is a positive displacement pump arranged to deliver a constant flow rate of the liquid through the heater.

6. A method as claimed in claim 1, wherein the desired final temperature is between 27° C. and 4° C.

7. A method as claimed in claim 1, wherein the second period of time is longer than the first period of time.

8. A method as claimed in claim 1, wherein the second volume of liquid is greater than the first volume of liquid.

9. A method as claimed in claim 1, wherein the predetermined volume of liquid is selected by a user.

10. A method as claimed in claim 1, comprising calculating the first and second periods of time for operating the pump to dispense the first and second volumes of liquid.

11. A method as claimed in claim 1, further comprising measuring the mains supply voltage and adjusting operation of the heater and/or of the pump to take into account the mains supply voltage.

12. A method of operating an apparatus comprising a heater and an arrangement for dispensing a predetermined volume of a warm liquid, said method comprising the steps of:
   measuring the temperature of the liquid upstream of the heater;
   calculating an amount of energy required for the heater to heat the predetermined volume of the liquid from the upstream temperature to a desired final temperature;
   calculating a period of "ON" time required for energization of the heater to deliver the calculated amount of energy;
   energizing the heater for the calculated period of "ON" time;
   dispensing a first volume of directly heated liquid from an outlet of the apparatus during a first calculated period of time, wherein the first period of time is at least partly contemporaneous with the calculated period of "ON" time;
   de-energizing the heater; and
   dispensing a second volume of liquid from the outlet of the apparatus for a second calculated period of time subsequent to the first period of time, the second period of time being calculated such that the second volume of liquid is heated by removing substantially all residual heat from the heater, the first and second volumes together providing the predetermined volume heated by the calculated amount of energy, wherein the average temperature of the first and second volumes of the liquid is the desired final temperature after the predetermined volume has been dispensed.

13. A method as claimed in claim 12, wherein the desired final temperature is between 27° C. and 47° C.

14. A method as claimed in claim 12, wherein the predetermined volume of liquid is selected by a user.

15. An apparatus for dispensing a predetermined volume of a warm liquid, comprising a heater, a pump, a temperature sensor sensitive to the temperature of the liquid upstream of the heater, and a controller arranged to:

receive upstream temperature data from the temperature sensor, calculate the amount of energy required for the heater to heat a predetermined volume of the liquid from the upstream temperature to a desired final temperature, calculate a period of "ON" time required for energization of the heater to deliver the calculated amount of energy, energize the heater for the calculated period of "ON" time, operate the pump during a first period of time to dispense a first volume of heated liquid at or above a predetermined initial temperature from an outlet of the apparatus, wherein the first period of time is at least partly contemporaneous with the calculated period of "ON" time, de-energize the heater, and operate the pump for a second period of time subsequent to the first period of time, the second period of time being calculated such as to dispense a second volume of the liquid from the outlet of the apparatus so as to remove substantially all residual heat from the heater, the first and second volumes together providing the predetermined volume heated by the calculated amount of energy;

wherein the average temperature of the first and second volumes of the liquid is the desired final temperature after dispensing the predetermined volume.

16. An apparatus as claimed in claim 15, wherein the heater comprises a flow heater in which liquid is permitted to enter and exit the heater while heating is taking place.

17. An apparatus as claimed in claim 15, comprising a reservoir for supplying liquid to the heating means, and optionally an intermediate holding chamber between the reservoir and the pump, wherein the temperature sensor is located in the reservoir or in the intermediate holding chamber.

18. An apparatus as claimed in claim 15, wherein the desired final temperature is between 27° C. and 47° C.

19. An apparatus as claimed in claim 15, comprising an input to allow the predetermined volume of liquid to be selected by a user.

20. An apparatus as claimed in claim 15, wherein the controller is arranged to measure the mains supply voltage and adjust operation of the heater and/or of the pump to take into account the mains supply voltage.

* * * * *